United States Patent [19]

Nakamura et al.

[11] Patent Number: 5,913,039
[45] Date of Patent: Jun. 15, 1999

[54] VIDEO ON DEMAND SYSTEM WITH A TRANSMISSION SCHEDULE TABLE IN THE VIDEO SERVER INCLUDING ENTRIES FOR CLIENT IDENTIFIERS, VIDEO TITLES, AND REPRODUCTION START TIMES

[75] Inventors: Hiroki Nakamura, Moriguchi; Yuki Kusumi, Kashiba; Masahiro Oashi, Hirakata; Tatsuya Shimoji, Katano, all of Japan

[73] Assignee: Matsushita Electric Industrial Co., Ltd., Osaka, Japan

[21] Appl. No.: 08/785,061

[22] Filed: Jan. 17, 1997

[30] Foreign Application Priority Data

Jan. 19, 1996 [JP] Japan ................................. 8-007210
Jan. 10, 1997 [JP] Japan ................................. 9-003324

[51] Int. Cl.⁶ .............................. G06F 15/16; H04N 7/10
[52] U.S. Cl. ........................... 395/200.61; 348/7; 348/12
[58] Field of Search .................... 348/7, 12; 395/200.61

[56] References Cited

U.S. PATENT DOCUMENTS 5,508,732  4/1996  Bottomley et al. ..................... 348/7
5,701,852  12/1997  DeBey .................................. 455/5.1
5,808,607  9/1998  Brady et al. .......................... 345/327

FOREIGN PATENT DOCUMENTS 7264573  10/1995  Japan .

*Primary Examiner*—Zami Maung
*Assistant Examiner*—Andrew Caldwell
*Attorney, Agent, or Firm*—Price Gess & Ubell

[57] ABSTRACT

An on-demand communication system provides a multimedia server connected to a plurality of clients via a network. A data stream can be transmitted in response to a transmission request of a title from a transmission device at the site of the client. The transmission device will transmit a set of reproduction information, including a plurality of titles and reproduction start times to the server along with the client identification. The server contemporarily would store, in a buffer, the reproduction information and the client identifier, read the reproduction information and the client identifier and then create a set of transmission information for each client request. A timer unit can activate a timer assigned to the client to measure time when the data stream transmission device is to start transmitting the data stream to the client.

17 Claims, 23 Drawing Sheets

| client name | start time | transmission video name | transmission start point | transmission end point |
|---|---|---|---|---|
| client name | start time | transmission video name | transmission start point | transmission end point |
| client name | start time | transmission video name | transmission start point | transmission end point |
| A | 00 : 00 : 00 | Video A | 00 : 00 : 00 | 00 : 00 : 30 |
| | 00 : 00 : 30 | Video B | 00 : 00 : 30 | 00 : 01 : 15 |
| | 00 : 01 : 30 | Video C | 00 : 00 : 00 | 00 : 00 : 30 |

FIG. 2

201 reproduction schedule table

| start time | reproduction video name | reproduction start point | reproduction end point |
|---|---|---|---|
| 00 : 00 : 00 | Video A | 00 : 00 : 00 | 00 : 00 : 30 |
| 00 : 00 : 30 | Video B | 00 : 00 : 30 | 00 : 01 : 15 |
| 00 : 01 : 30 | Video C | 00 : 00 : 00 | 00 : 00 : 30 |

601 reproduction schedule table

| start time | reproduction video name | reproduction start point | reproduction end point |
|---|---|---|---|
| 00:00:00 | Video A | 00:00:00 | 00:00:30 |
| 00:00:30 | Video B | 00:00:30 | 00:01:15 |
| 00:01:30 | Video C | 00:00:00 | 00:00:30 |

602 start time
603 reproduction video name
604 reproduction start point
605 reproduction end point

FIG. 7

| client name | start time | transmission video name | transmission start point | transmission end point |
|---|---|---|---|---|
| A | 00:00:00 | Video A | 00:00:00 | 00:00:30 |
| | 00:00:30 | Video B | 00:00:30 | 00:01:15 |
| | 00:01:30 | Video C | 00:00:00 | 00:00:30 |

704 — client name
701 — start time
702 — transmission video name
703 — transmission start point

FIG. 12

| start time | reproduction video name | reproduction start point | reproduction end point |
|---|---|---|---|
| 00 : 00 : 00 | Video A | 00 : 00 : 00 | 00 : 00 : 30 |
| 00 : 00 : 30 | Video B | 00 : 00 : 30 | 00 : 01 : 15 |
| 00 : 01 : 15 | Video Null | 00 : 00 : 00 | 00 : 00 : 15 |
| 00 : 01 : 30 | Video C | 00 : 00 : 00 | 00 : 00 : 30 |

1601 reproduction schedule table

| start time | reproduction video name | reproduction start point | reproduction end point |
|---|---|---|---|
| 00:00:00 | Video A | 00:00:15 | 00:00:30 |
| 00:00:15 | Video B | 00:00:30 | 00:01:15 |
| 00:01:15 | Video C | 00:00:00 | 00:00:30 |

602 — start time
603 — reproduction video name
604 — reproduction start point
605 — reproduction end point

VIDEO ON DEMAND SYSTEM WITH A TRANSMISSION SCHEDULE TABLE IN THE VIDEO SERVER INCLUDING ENTRIES FOR CLIENT IDENTIFIERS, VIDEO TITLES, AND REPRODUCTION START TIMES

BACKGROUND OF THE INVENTION

1. Field of the Invention

The present invention relates to an on-demand communication system consisting of a plurality of clients and servers connected via a network.

2. Description of the Related Art

Due to the recent development of communication networks and digital data compression techniques, new technology are getting commercially available, One example is digital cable television system in which a video server and each client in individual household are connected via a network and specific programs demanded by each client are provided. Another example is an interactive service system in which a satellite digital broadcast and telephone lines are used.

FIG. 1 shows construction of the conventional on-demand communication system comprising clients 101, 102, 103, . . . , video server 120, and network 130 connecting each client, and video server 120.

Client 101 comprises external input interface unit 111, client control unit 112, reproduction schedule table storage unit 113, clock unit 114, client I/O interface unit 115, and output decoder 116. Other clients have the same construction.

Server 120 comprises data stream storage unit 121, server I/O interface unit 122, input queue buffer unit 123, server control unit 124, job schedule storage unit 125, and data stream output unit 126.

Network 130 comprises a heavy circuit for transmitting data streams from server 120 to each client end a thin line for transmitting control information from each client to server 120.

In this on-demand communication system, communication from client 101 to server 120 is carried out in the following way. A transmission request is transmitted from client I/O interface unit 115 to server I/O interface unit 122 via network 130 such as telephone lines. It is stored in input queue buffer unit 123 and read by server control unit 124. On the other hand, communication from server 120 to client 101 is carried out in the following way. A data stream is transmitted from server I/O interface unit 122 and processed by client control unit 112. It takes three to five seconds as the processing time of the communication from client 101 to server 120, which is longer than the other way around.

In an on-demand communication system thus constructed, in order to obtain a multi-media title of the desired date stream from server 120, a viewer transmits a request of the multimedia title information from remote controller 141 to external input interface unit 111 in client 101. Next, client 101 transmits the request to server 120 via network 130, obtains the information from server 120, and stores the information in reproduction schedule table in reproduction schedule table storage unit 113. FIG. 2 shows an example of a reproduction schedule table of multi-media tittles. In this reproduction schedule table 201, reproduction video name 202, reproduction start point 203, and reproduction end point 204 are stored chronologically with reproduction start time 205 of the first video data being "00:00:00" (hours: minutes: seconds).

In order to reproduce a data stream according to reproduction schedule table 201, a viewer transmits a request to select reproduction schedule table 201 from remote controller 141 to client 101. Client control unit 112 receives this request via external input interface unit 111, refers to reproduction schedule table 201 stored in reproduction schedule table storage unit 113, and instructs client I/O interface unit 115 to transmit a transmission request of the data streams of "Video A" and "Video B" which are placed together in a chronological order (there is no time difference between reproduction end point 204 and reproduction start point of the next video). On receiving the instruction, client I/O interface unit 115 transmits the transmission request of "Video A" and "video B" to server I/O interface unit 122 via network 130.

In server 120, I/O interface unit 122 stores the transmission request of "Video A" and "video B" in input queue buffer unit 123 along with the client name. Server control unit 124 reads the transmission request of client 101 in input queue buffer unit 123, posts "Video A" and the client name to data stream output unit 126, and then, stores "Video B" and the client name in job schedule storage unit 125. Data stream output unit 126 locates the start of the data stream of "Video A" from data stream storage unit 121 and outputs it to server I/O interface unit 122 along with the client name. Server I/O interface unit 122 transmits the data stream of "Video A" to client 101 which has transmitted the transmission request via network 130, After completing transmission of the data stream of "Video A", data Stream transmission unit 121 posts the client name to server control unit 124. Server control unit 124 reads "Video B" stored in job schedule storage unit 125 along with the client name, and posts them to data stream output unit 126. After that, data stream output unit 126 locates the start of the data stream of "Video B" from data stream storage unit and transmits it to server I/O interface unit 122 along with the client name. Next, server I/O interface unit 122 transmits the data stream of "Video B" to client 101.

In client 101, on receiving the notification of the data stream of "Video A" transmitted from server 120 via network 130, external input interface unit 115 posts it to output decoder unit 116 via client control unit 112.

By referring to the clock in clock unit 114, client control unit 112 sets "00:00:00" as a start time in order to start measuring time when output decoder unit 116 reproduces "video A" on TV monitor 142 by deciphering the data stream. When the reproduction of "Video A" is completed, time measuring is also completed. The moment at that time "00:00:30" is stored. When output decoder unit 116 reproduces "Video B" again, time measuring is resumed from "00:00:30". When the reproduction of "Video B" is completed, the time is "00:01:15". Referring to reproduction schedule table 201 in reproduction schedule storage unit 113, client control unit 112 reads that "Video C" should be reproduced in 15-second null time after the reproduction of "Video B" is completed. When the time is "00:01:30", client control unit 112 instructs client I/O interface unit 115 to transmit transmission request of the data stream of "Video C". The transmission request from client I/O interface unit 115 is stored in queue buffer unit 123 in server 120 and read by server control unit 124. The date stream of "Video C" is transmitted to client 101 like the case of "Video A" and "Video B".

FIG. 3 is the time chart of the video reproduction which is handled in the above mentioned way. In this figure, the horizontal line at the bottom shows time. The top line shows operations of server 120, and the middle line shows those of client 101. At $A_0$, client 101 transmits the transmission request to server 120. At $A_1$, the start of the data stream of "Video A" is located in server 120. At $A_2$, the transmission of the data stream to client 101 starts. At the same time, "Video A" is reproduced in client 101. At $A_3$, the reproduction is completed, and locating the start of the data stream of "Video B" stored in server 120. At $A_4$, transmission of the data stream starts. At $A_5$, reproduction of "Video B" is completed in client 101. After that, there is a null time. At $A_6$, the transmission request of "Video C" is transmitted to server 120. In server 120, the start of the data stream of "Video C" is located at $A_7$. At $A_8$, transmission of the data stream of "Video C" to client 101 starts. In client 101, reproduction of "Video C" starts at $A_8$. At $A_9$, the reproduction is completed.

In client 101, if a viewer gives instruction to stop "Video A" which is being reproduced on TV monitor 142 for a brief period of time by using remote controller 141, external input interface unit 111 receives the signal of remote controller 141 and posts it to client control unit 112. Client control unit 112 instructs output decoder unit 116 to stop the reproduction of the video for a brief period of time, and also instructs client I/O interface unit 115 to transmit a pause request of the data stream transmission to server 120. On receiving the instruction, output decoder unit 116 stops reproduction of "Video A". Client I/O interface unit 115 transmits the client name and the pause request of the data stream transmission to server I/O interface unit 122 in server 120 via network 130.

In server 120, server I/O interface unit 122 receives the pause request of the data stream transmission and the client name from client 101, and stores them in input queue buffer unit 123. On reading the pause request of the data stream transmission stored in input queue buffer unit 123, server control unit 124 instructs data stream transmission unit 126 to stop the transmission of the data stream. On receiving this instruction, data stream transmission unit 126 stops reading the data stream from data stream storage unit 121 and transmitting the data stream to server I/O interface unit 122.

When a viewer instructs "cancel pause" by using remote controller 141, external input interface unit 111 posts the instruction to client control unit 112. Client control unit 112 instructs client I/O interface unit 115 to transmit the "cancel pause" request. Client I/O interface unit 115 transmits "cancel pause" request to server I/O interface unit 122 via network 130.

On receiving the notification of the "cancel pause" request, server I/O interface unit 122 stores it and the client name in input queue buffer unit 123. On reading the "cancel pause" request stored in input queue buffer unit 123, server control unit 124 posts the request and the client name to data stream transmission unit 126, Data stream transmission unit 126 resumes reading the data stream and transmits it to server I/O interface unit 122. Server I/O interface unit 122 transmits the data stream to client 101 via network 130. On receiving the notification of the data stream, client 101 outputs it to TV monitor 142 for reproduction. FIG. 4 shows a time chart of reproducing a video whose reproduction is stopped for a brief moment and resumed after that. The same parts as FIG. 3 are given the same reference characters and numbers. At $B_1$, a viewer designates a pause in the reproduction of "video A" by using remote controller 141 and TV monitor 142 immediately stops the reproduction. However, server 120 continues outputting the data stream until $B_2$. At $B_3$, the viewer designates cancelling a pause in the reproduction of video. At $B_5$, reproduction of "Video A" is resumed on TV monitor 142.

However, the above mentioned on-demand communication system has some problems. As is apparent from FIGS. 3 and 4, it takes $dT_i+dT_5$ from $A_0$ to $A_2$: $dT_1$ is the time needed for storing and processing the transmission requests from client 101, 102, 103, . . . in queue buffer unit 123, which is three to five seconds in average; and $dT_a$ is the time needed to locate the start of the data stream of the video. In the case of video which is reproduced without a pause, $dT_1$ exists only at the beginning when the transmission request is transmitted. In the case of a video which has a null time $T_0$ at some mid point, $dT_2$ which is the same time period as $dT_1$ is needed in order to create a transmission request again. And the reproduction of the video delays by the amount of time $dT_2$. This $dT_2$ can be neglected when reproducing conventional video programs as they are reproduced at a dash in most cases. However, $dT_2$ can be irritating when a different short video programs are not reproduced continuously.

As is shown in FIG. 4, when video reproduction is stopped and resumed after a brief period of time, it takes dTP for server 120 to stop transmission of the data stream. Therefore, the data stream which will be transmitted when the transmission of the data stream is resumed is ahead of the video which is outputted by TV monitor 142 by dTP. Therefore, a part of the video which is equivalent to dTP will not be reproduced. As is apparent from FIGS. 3 and 4, not only dTP, but also dTa, dTb, and dTc are irritating to viewers.

SUMMARY OF THE INVENTION

An object of the present invention is to provide an on-demand communication system which does not require time for processing the transmission request of the data stream while the video reproduction is going on.

Another object of the present invention is to provide an on-demand communication system in which no jumping of the video reproduction occurs between a pause instruction and a pause cancel instruction.

Still another objective of the present invention is to provide an on-demand communication system in which video reproduction is not delayed due to the time needed for locating the start of each data stream of the title of the transmission request.

According to the following two features, it is possible to omit the time needed for the processing of the transmission request while the data stream is transmitted.

(1) An on-demand communication system in which a plurality of clients and a multi-media server are connected via a network and a data stream is transmitted in response to a transmission request of a title from one of the clients, each client comprising: a transmission device which transmits a set of reproduction information comprising a plurality of titles and reproduction start time of each of their the data streams to the server along with a client identifier for identification; a reception device for receiving the data stream transmitted from the server; and a reproduction and output device for reproducing and outputting the data stream received by the reception device, the server comprising: a reception buffer for temporarily storing the set of the reproduction information and the client identifier transmitted from the transmission device; a transmission information creation device for reading the set of the reproduction information and the client identifier stored in the reception buffer and creating a set of transmission information for each client, wherein the transmission information includes a title and a transmission start time that are equal to the title and the reproduction start time in the reproduction information; a transmission information storage device for storing the set of the transmission information for each client which was created by the transmission information creation device; a data stream storage device for storing groups of data stream per titles a transmission instruction device for reading the set of the transmission information stored in the transmission information storage device and giving a transmission instruction when the transmission start time comes; and a data stream transmission device for reading the data stream which corresponds to the title in the transmission information and is stored in the data stream storage device and transmitting it to the client, wherein the transmission instruction includes the title and the client identifier.

(2) The transmission information created by the transmission information creation device may comprise transmission point information including a transmission start point and a transmission end point of the data stream of the title, wherein the reproduction information transmitted from the client includes reproduction point information including a reproduction start point and a reproduction end point of the data stream of the title, wherein the transmission instruction device of the server may include: a timer unit which activates a timer assigned to the client and measures time when the data stream transmission device starts transmitting the data stream; a transmission start determination unit for determining whether the time measured by the timer unit has reached the transmission start time; and an instruction unit which instructs the data stream transmission device to transmit the data stream, posting the transmission point information, when the transmission start determination unit determines that the time measured by the timer unit has reached the transmission start time, wherein the data stream transmission device may include; a start-locating unit for locating the start of the date stream on being given the transmission instruction including the transmission start point of the data stream of the title from the instruction unit; a timer interruption unit which stops the timer in the timer unit while the start-locating unit is locating the start of the data stream; and a transmission unit for transmitting the data stream up to the transmission end point after the start of the data stream is located by the start-locating unit.

According to the following two features, even if the null time exists between the data streams of the titles, it is possible to realize the same processing as the one of the transmission request which does not include the null time.

(3) The client may further include; a reproduction information adding device which adds new reproduction information between continuing two units of reproduction information when the null time can be recognized by the reproduction start time and the reproduction point information between two data streams belonging to the continuing two units of reproduction information, respectively, the new reproduction information including a dummy title and reproduction start time of the data stream of the dummy title, wherein the reproduction information transmitted by the transmission device comprises the reproduction point information shown by the time needed when the reproduction start point and the reproduction end point of the data stream of the title are reproduced under a normal condition; a reproduction and output prohibiting device for prohibiting the reproduction and output of the reproduction output device while the reception device is receiving the dummy data stream, which includes a reproduction and output prohibiting request, the server may further include; a dummy data stream storage device for storing the dummy data stream of the dummy title; and a dummy data stream transmission device which reads the dummy data stream stored in the dummy data stream storage device and transmits it to the client when the dummy title is included in the transmission instruction.

(4) The reproduction information adding device may include: a reproduction end time calculating unit which calculates $K_4=K_1+(K_3-K_2)$, with $K_1$ being the reproduction start time, $K_2$ being the reproduction start point, $K_3$ being the reproduction end point, and $K_4$ being the reproduction end time of the data stream of the title; a null time determination unit which determines that null time exists when $K_6 \neq 0$ after calculating $K_6=K_5-K_4$, with $K_5$ being the reproduction start time of the data stream of the next title; a reproduction information inserting unit which inserts the reproduction information of the dummy title whose data stream reproduction start time is $K_4$, data stream reproduction start point is "O", and data stream reproduction end point is $K_6$ when the null time determination unit determines that the null time exists.

According to the following two features, it is possible to guarantee the continuity of the data stream to be reproduced and outputted even if the viewer temporarily stops the reproduction and output and cancels the pause later.

(5) Each client may further include; a reproduction pause operation device which temporarily stops the reproduction and output of the reproduction Output device; a reproduction time measuring device which measures the reproduction time of the data stream of the title until the reproduction and output of the reproduction output device is temporarily stopped; a pause request transmission device which transmits a pause request of the transmission of the data stream to the server when the reproduction and output is temporarily stopped; a pause cancel operation device which receives a cancel request of the pause; a reproduction information change device which changes the set of the reproduction information based on the reproduction time measured by the reproduction time measuring device when the cancel request is received, wherein the reproduction information comprises the reproduction point information including the reproduction start point and the reproduction end point of the date stream of the title; a cancel request transmission device for transmitting the client identifier and the set of the reproduction information changed by the reproduction information change device to the server along with the cancel request, wherein the server may further include: a pause request and cancel request receiving buffer which temporarily stores the pause request transmitted from the pause request transmission device and the cancel request including the set of the reproduction information and the client identifier transmitted from the cancel request transmission device; a transmission pause instruction device which reads the pause request stored in the pause request and cancel request receiving buffer and instructs the data stream transmission device to temporarily stop the transmission of the data stream to the client, thereby the data stream transmission device temporarily stops the transmission of the data stream to the client; a transmission information change device which reads the set of the reproduction information and the client identifier stored in the pause request and cancel request receiving buffer, creates new transmission information, and changes the transmission information of the client already stored in the transmission information storage device to the new transmission information; and a pause cancel instruction device which activates the transmission instruction device when the transmission information change device changes the transmission information.

(6) The reproduction information change device may include a reproduction start time calculating unit which calculates TN =TN−(TB+TD), with TB being the reproduction start time of the data of the title whose reproduction and output is temporarily stopped, TN being the start time of the data stream of the title to be reproduced after the said title, TD being the reproduction time measured by the reproduction time measuring device; a reproduction information updating unit which updates the start time of the data stream of the title to be reproduced after the title whose reproduction and output is temporarily stopped to TN calculated by the reproduction start time calculation unit, the start time of the data stream of the title whose reproduction and output is temporarily stopped to "O", and "TR" to "TR+TD", with TR being the reproduction start point of the title whose reproduction and output is temporarily stopped; a reproduction information deletion unit for deleting the reproduction information of the title reproduced before the title whose reproduction and output is temporarily stopped from the set of the reproduction information.

According to the following four features, it is possible to prevent discontinuation of the output due to the locating of the start of the date stream to be reproduced and outputted.

(7) The server may further include: a start-locating instruction device which reads the set of transmission information stored in the transmission information storage device and instructs locating a start of the data stream at a given time earlier than the transmission start time; and a data stream start-locating device for locating the start of the data Stream on receiving the instruction from the start-locating device.

(8) The transmission information created by the transmission information creation device may comprise transmission point information including a transmission start point and a transmission end point of the data stream of the title, and the reproduction information transmitted from the client includes reproduction point information including a reproduction start point and a reproduction end point of the data stream of the title, wherein the start-locating instruction device of the server may include: a first timer unit which activates a timer assigned to the client and measures time when the data stream transmission device starts transmitting the data stream; a launch of start-locating determination unit for determining whether the time measured by the timer unit has reached the given time earlier than the transmission start time; and a first instruction unit which instructs the data stream start-locating device to locate the start of the data stream, posting the transmission start point of the data stream of the title.

(9) The transmission instruction device of the server may include; a second timer unit which activates a timer assigned to the client and measures time when the data stream transmission device starts transmitting the data stream; a transmission start determination unit for determining whether the time measured by the timer unit has reached the transmission start time; and a second instruction unit which instructs the data stream transmission device to transmit the data stream, posting the transmission end point of the data stream of the title.

(10) The reproduction point information and the transmission point information may be shown by the time needed when the data stream of the title is reproduced under a normal condition.

(11) Each client may further include: a reproduction information obtaining device for obtaining a list of the sets of reproduction information which can be received from the server; and a reproduction information set selection device which receives one of the sets of the reproduction information selected by a viewer.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 shows an example of reproduction schedule table stored in a reproduction schedule table storage unit of the above mentioned on-demand communication system;

FIG. 4 shows a time chart of reproducing a video whose reproduction is stopped for a brief moment and resumed after that;

FIG. 6 shows an example of reproduction schedule table stored in a reproduction schedule table storage unit of the first embodiment;

FIG. 7 shows an example of a transmission schedule table stored in the job schedule storage unit of the first embodiment;

FIG. 12 shows an example of a reproduction schedule table created in the schedule unification unit of the second embodiment;

FIG. 16 shows an example of a reproduction schedule table changed in the stop time confirmation unit of the third embodiment;

DESCRIPTION OF THE PRESENT EMBODIMENT (Embodiment 1)

Figure 5:
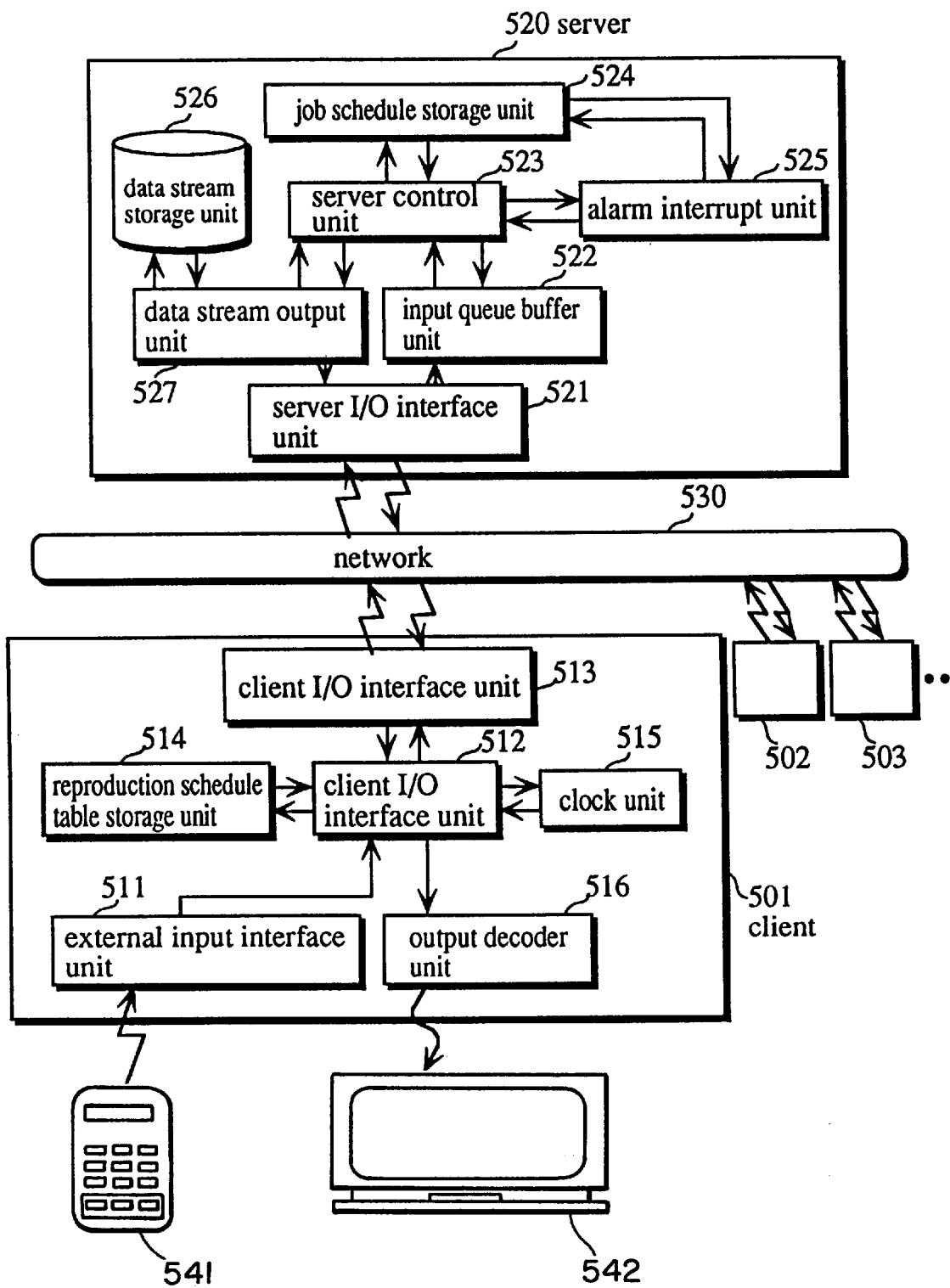
FIG. 5 shows construction of an on-demand communication system of the first embodiment of the present invention.

FIG. 5 shows construction of the on-demand communication system of the first embodiment of the present invention.

This on-demand communication system comprises a plurality of clients 501, 502, 503, . . . , server 520, and network 530 connecting each client and server 520.

Client 501 comprises external input interface unit 511, client control unit 512, client I/O interface unit 513, reproduction schedule table storage unit 514, clock unit 515, output decoder unit 516, remote controller 541 which is an input device for inputting a viewer instruction to external input interface unit 511, and TV monitor 542 which outputs the video reproduced in output decoder unit 516.

Server 520 comprises server I/O interface unit 521, input queue buffer unit 522, server control unit 523, job schedule storage unit 524, alarm interrupt unit 525, data stream storage unit 526, and data stream output unit 527.

Remote controller 541 comprises the following buttons: a schedule request button for requesting transmission of the reproduction schedule table which stores the video reproduction schedule of server 520; a schedule selection button for selecting one of a plurality of reproduction schedule tables transmitted from server 520; and buttons for pause of video reproduction, restart of the reproduction, end, forward, and rewind. When the viewer presses one of those buttons, remote controller 541 outputs a corresponding operation signal to external input interface unit 511.

On receiving the notification of the operation signal of transmission request of the reproduction schedule table from remote controller 541, external input interface unit 511 posts it to client control unit 512. On receiving the notification of the operation signal of the selected reproduction schedule table, external input interface unit 511 posts the selected reproduction schedule table to client control unit 512.

Client control unit 512 comprises CPU and controls each unit of client 501. On receiving the notification of the transmission request of the reproduction schedule table from external input interface unit 511, client control unit 512 instructs client I/O interface unit 513 to request server 520 to transmit the reproduction schedule. on receiving the notification of the reproduction schedule table from client I/O interface unit 513, client control unit 512 stores it in reproduction schedule table storage unit 514 and also posts it to output decoder unit 516.

On receiving the notification of the designated reproduction schedule table from external input interface unit 511, client control unit 512 reads it from reproduction schedule table storage unit 514 and posts it to client I/O interface unit 513.

On receiving the designation of the data stream from client I/O interface unit 513, client control unit 512 posts it to output decoder unit 516. Also, by referring to clock unit 515, client control unit 512 measures video reproduction time, setting the time at which output decoder unit 516 started video reproduction as "00:00:00". When the video reproduction is paused, client control unit 512 does not measure time.

On receiving the instruction of the transmission request of the reproduction schedule table from client control unit 512, client I/O interface unit 513 transmits the transmission request of the reproduction schedule table with the client name for identification to server I/O interface unit 521 via network 530.

On receiving the notification of the reproduction schedule table from client control unit 512, client I/O interface unit 513 transmits the reproduction schedule table with the client name for identification to server I/O interface unit 521 via network 530.

On receiving the notification of the data stream from server I/O interface unit 521 via network 530, client I/O interface unit 513 posts it to client control unit 512.

Reproduction schedule table storage unit 514 is composed of RAM and the like, is written a plurality of reproduction schedule tables sent from server 520 by client control unit 512. FIG. 6 shows an example of the reproduction schedule table. In reproduction schedule table 610, the column of reproduction video name 603 comprises multi-media titles. The reproduction start time 602 of the first video is set as "00:00:00" According to this table, "video A" is reproduced at "00:00:00", "Video B" at "00:01:30", and "Video C" at "00:01:30". Reproduction start point 604 and reproduction end point 605 of each reproduction video name 603 are shown under the condition that the videos are reproduced from the start at the normal state. Here, the multi-media titles means the data stream that server 520 is requested from client 501.

Clock unit 515 comprises a clock and is referred to by client control unit 512.

On receiving the notification of the reproduction schedule table from client control unit 512, output decoder unit 516 displays it on TV monitor 542. In this way, the viewer can select one of the production schedule tables.

On receiving the notification of the data stream from client control unit 512, output decoder unit 516 decodes the coded data stream and outputs it to TV monitor 542 for display.

On receiving the notification of the transmission request of the reproduction schedule table from client I/O interface unit 513 via network 530, server I/O interface unit 521 stores the transmission request of the client name and the reproduction schedule table in input queue buffer unit 522. On receiving the notification of the client name and the reproduction schedule table from data stream output unit 527, server I/O interface unit 521 transmits the reproduction schedule table to client I/O interface unit 513 of client 501 which is identified by the client name via network 521.

On receiving the notification of the reproduction schedule table and the client name from client I/O interface unit 513 via network 530, server I/O interface unit 521 stores them in input queue buffer 522.

On receiving the notification of the client name and the data stream from data stream output unit 527, server I/O interface unit 521 transmits the data stream to client I/O interface unit 513 of client 501 which is identified by the client name via network 530.

Input queue buffer unit 522 is composed of RAM and the like, and temporarily stores the transmission request of the reproduction schedule table received by server I/O interface unit 521 and the reproduction schedule table along with the client name.

Server control unit 523 comprises CPU and controls the entire server 520. On reading the transmission request of the reproduction schedule table from client 501, 502, 503, server control unit 523 instructs data stream output unit 527 to transmit the reproduction schedule table and the client name.

On reading the reproduction schedule table which is the transmission request of the data stream from each client in input queue buffer unit 522, server control unit 523 converts the reproduction schedule table to the transmission schedule table for each client, stores it in job schedule storage unit 524, and sets a timer for each client which requests transmission of the date stream in alarm interrupt unit 525. At the same time, server control unit 523 posts the fist transmission video name, its transmission start point and transmission and point stored in transmission schedule table in job schedule storage unit 514 and the client name to data stream output unit 527. At this time, server control unit 523 gives "*", which means that the data stream is being outputted, to the transmission video name in the transmission schedule table in job schedule storage unit 524. On receiving the notification that the output of the date stream is started from data stream output unit 527 along with the client name, server control unit 525 initializes and starts the timer for client 501 in alarm interrupt unit 525.

On receiving the notification of the client name from alarm interrupt unit 525, server control unit 523 reads the transmission video name which is next to the video marked with "*" in the transmission schedule table for client 501 in job schedule storage unit 524 and removes the mark "*" to it. At the same time, server control unit 523 posts the transmission video name, its transmission start point and transmission end point, and the client name to the data stream output unit 527. On receiving the notification that the output of the data stream is started from data stream output unit 527 along with the client name, server control unit 523 re-activates the timer for client 501 in alarm interrupt unit 525.

Job schedule storage unit 524 is composed of RAM. Transmission schedule tables which are the transmission request of the data streams are written into job schedule storage unit 524 by server control unit 523 for each client. And server control unit 512 gives the mark "*" to the transmission video name, which means that the data stream transmission unit 527 is transmitting the data stream of its tittle.

FIG. 7 shows transmission schedule table 701 when the data stream of "Video A" is transmitted to client 501 (client name "A"). "Video A" in the column of transmission video name 702 is given "*" 703. Reproduction schedule table 601 stored in reproduction schedule table storage unit 514 in client 501 and transmission schedule table 710 are basically the same except that client 704 is stored and that the name "reproduction" and "transmission" are different.

Alarm interrupt unit 525 has timers for each client. When one of the timers is activated by server control unit 523, it continues measuring time until the start time of the title to be transmitted next in the transmission schedule table corresponding to the client of the timer in job schedule storage unit 524 (the transmission video name which is next to the one marked with "*"). When the timer reaches that time, it stops, and the client name is posted to server control unit 523. When the timer is reactivated by server control unit 523, the timer continues measuring time until the start time of the tittle which should be transmitted next When the timer reaches that start time, alarm interrupt unit 525 posts the client name to server control unit 523.

Data stream storage unit 526 is composed of an optical disk, a magnetic disk and the like, and stores the date stream shown by the multi-media title provided by server 520 and the reproduction schedule table.

On receiving the instruction of the transmission of the reproduction schedule table from server control unit 523, data stream output unit 527 reads the reproduction schedule table stored in data stream storage unit 526 and posts it to server I/O interface unit 521 along with the client name.

On receiving the notification of the transmission video name, its transmission start point and transmission end point, and the client name front server control unit 523, data stream output unit 527 locates the start of the data stream shown by the transmission video name in data stream storage unit 526 and outputs the data stream to I/O interface unit 521 along with the client name. When the transmission of the data stream is started, data stream output unit 527 notifies server control unit 523 that the transmission of the client name and the data stream have been started.

Network 530 is composed of telephone lines and optical fiber circuits. Transmission from each client to server 520 is carried out by the telephone lions and the other way around is by the optical fiber circuits.

Figure 8:
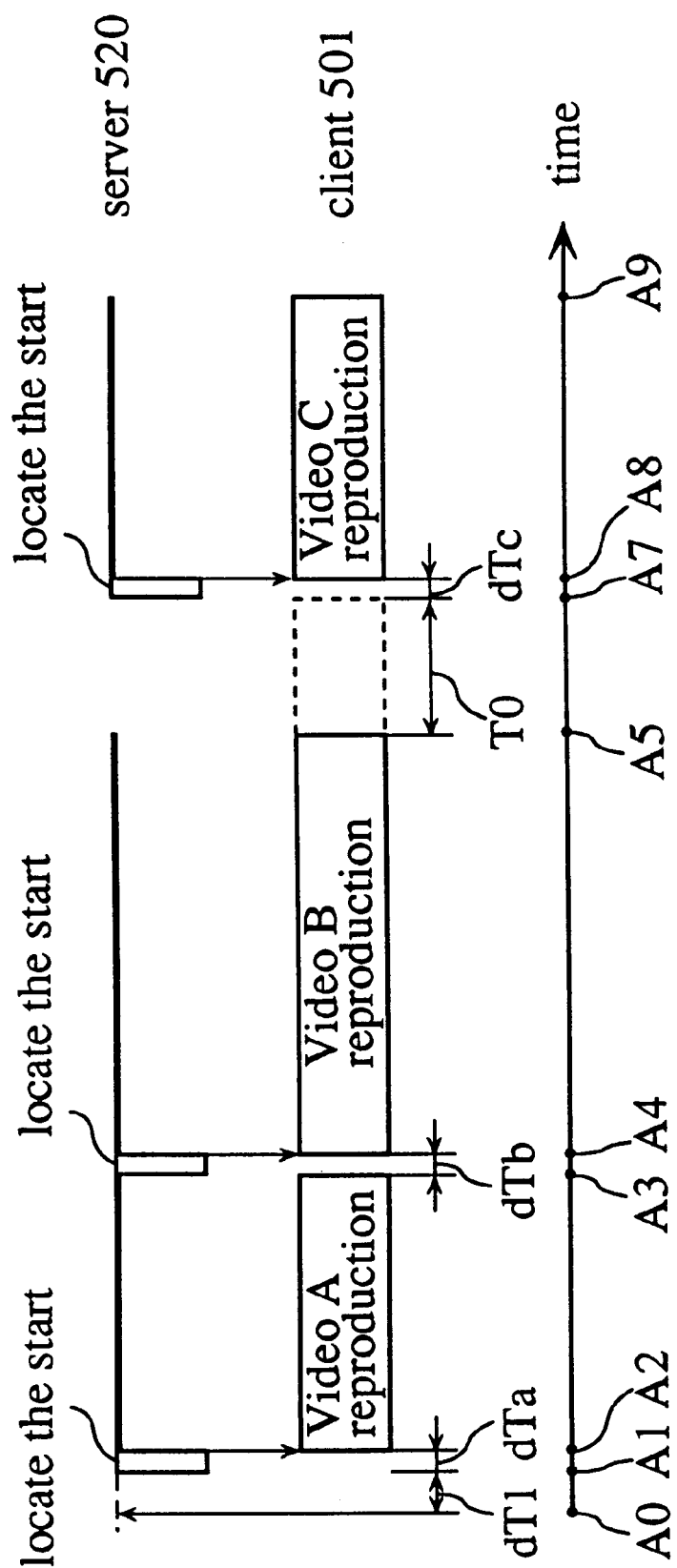
FIG. 8 shows a time chart of video reproduction of the first embodiment.

FIG. 8 shows the time chart of the video reproduction in the on-demand communication system mentioned above. In this figure, the horizontal line at the bottom shows time, The top line shows operations of server 520, and the middle line shows those of client 501. The thick line of server 520 shows that the data stream is being transmitted. The difference between FIG. 8 and FIG. 3, which is the time chart of the conventional on-demand communication system, is that $dT_2$ between $A_6$ and $A_7$ does not exist in FIG. 8.

Figure 1:
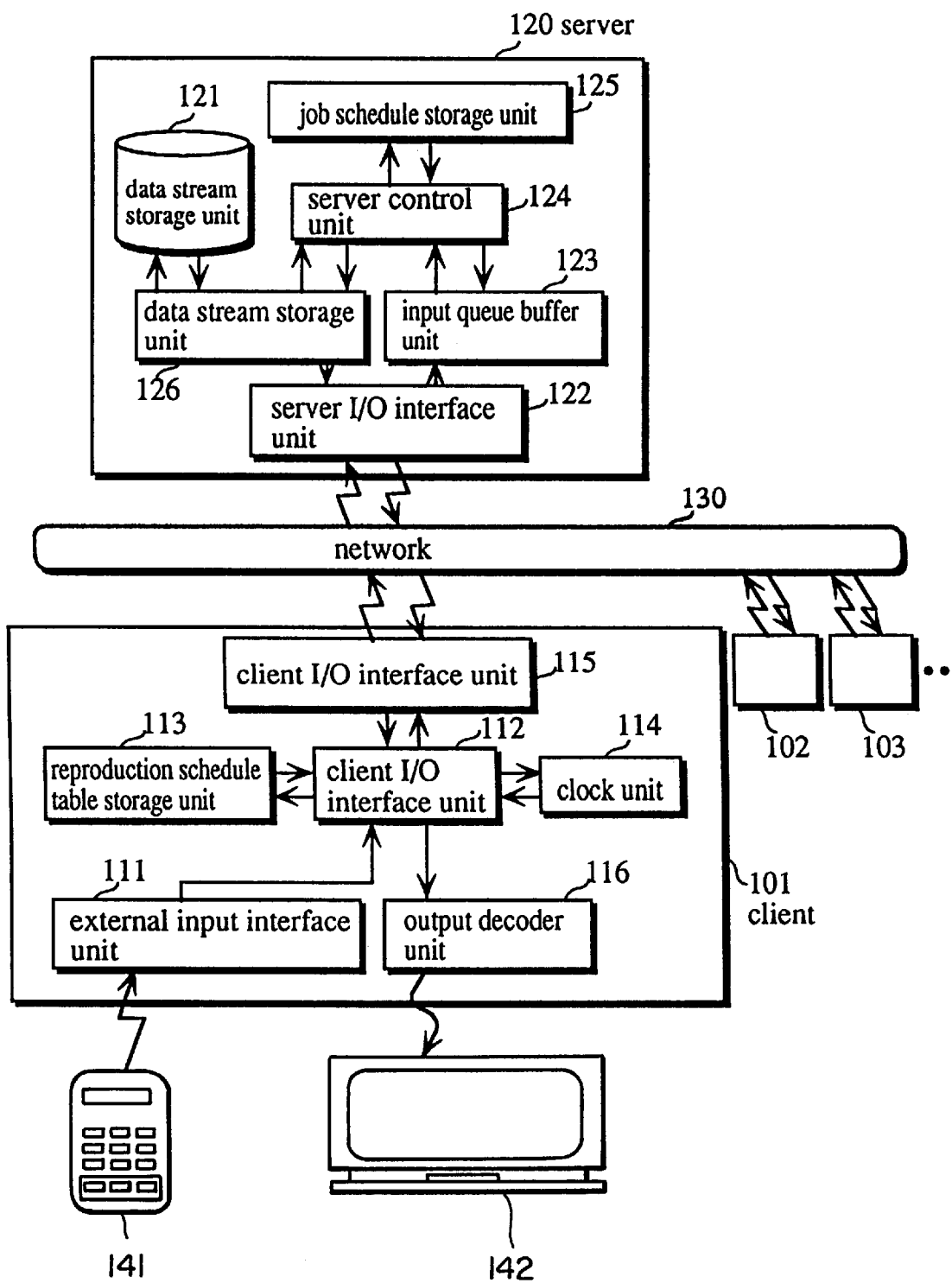
FIG. 1 shows construction of the conventional on-demand communication system.
Figure 3:
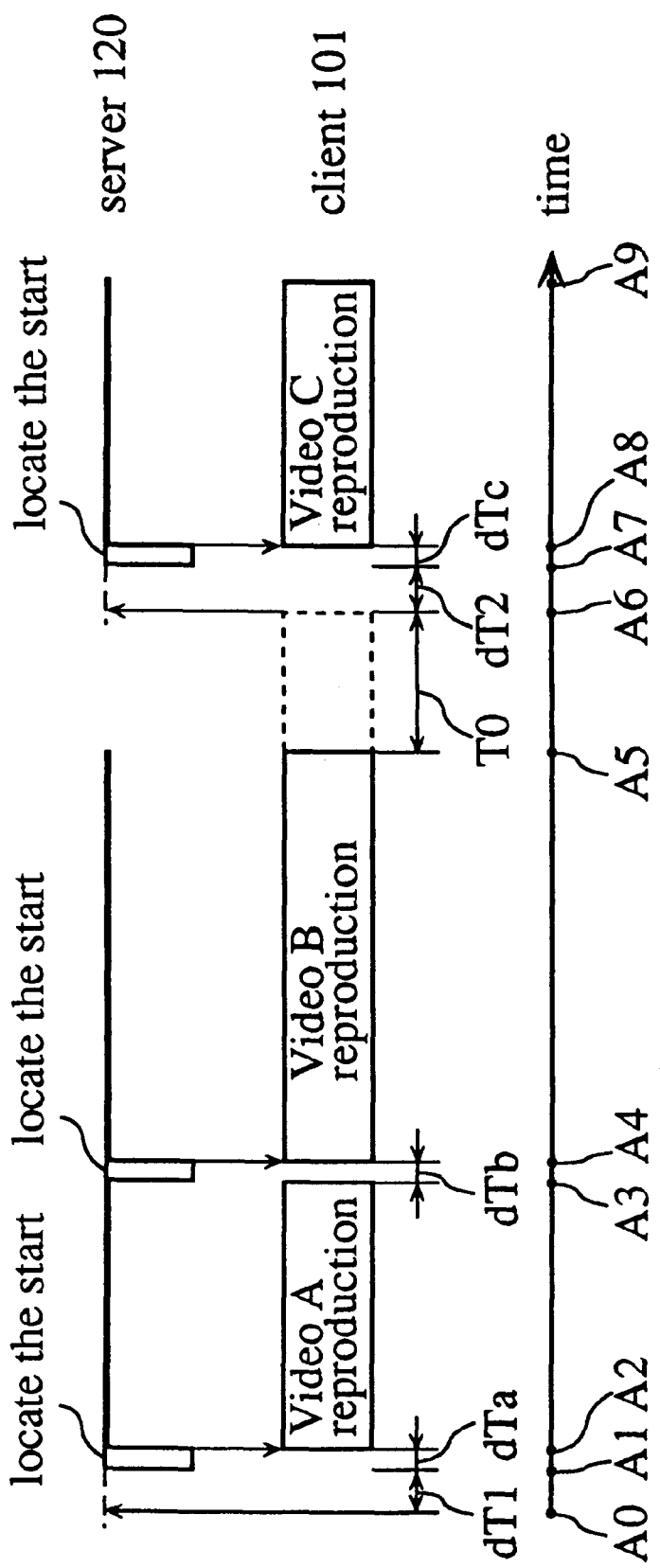
FIG. 3 is a time chart of the video reproduction in the above mentioned on-demand communication system.
Figure 4:
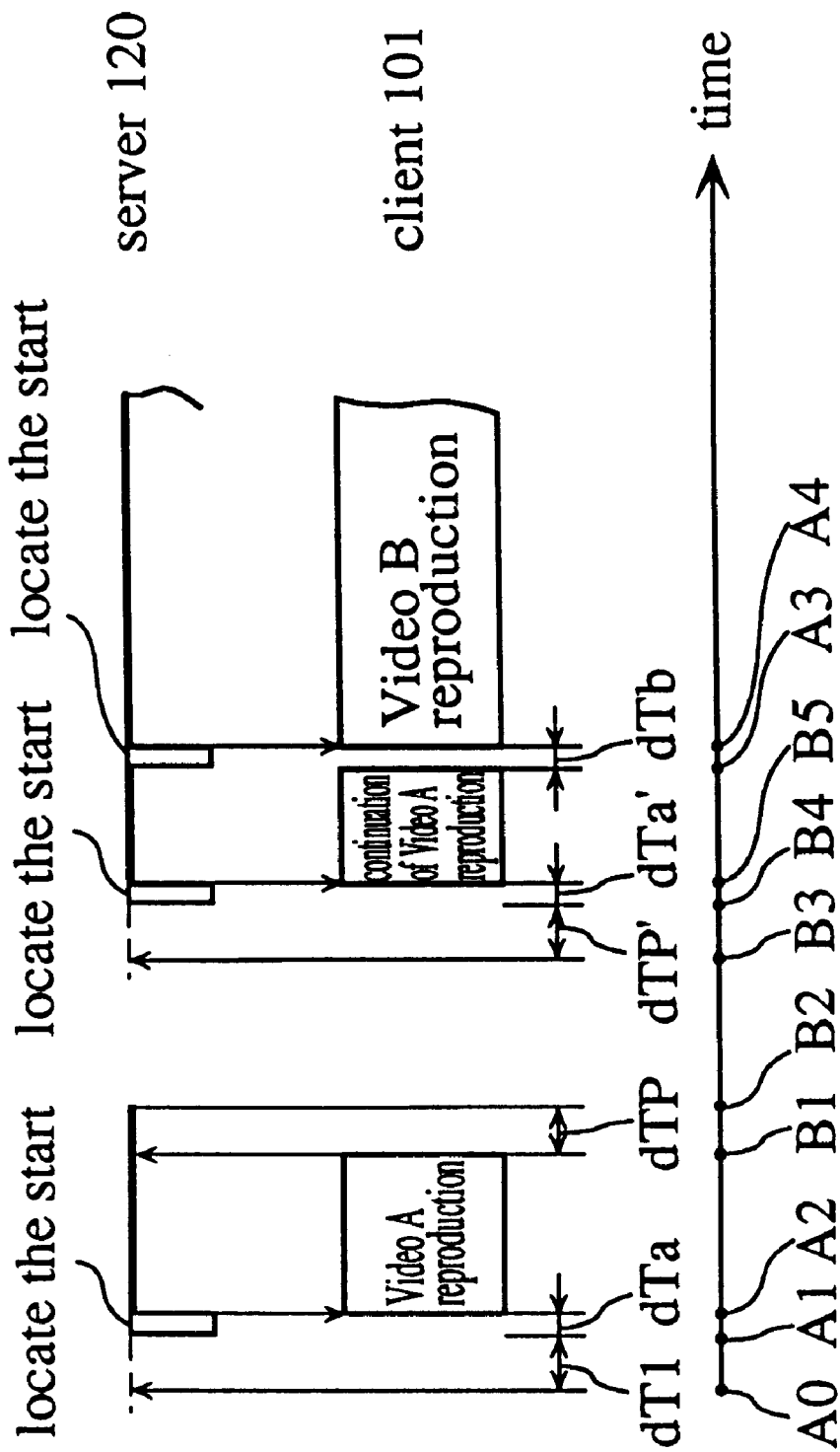

This can be explained as follows. In the case of FIG. 3, client 501 transmitted the transmission request of the data stream by showing different reproduction video names which do not continue. On the other hand, in the case of FIG. 8, server 520 has the transmission schedule table in which the transmission start time of each transmission video name is stored with the start time of the first video reproduction being "00;00;00".

Figure 9:
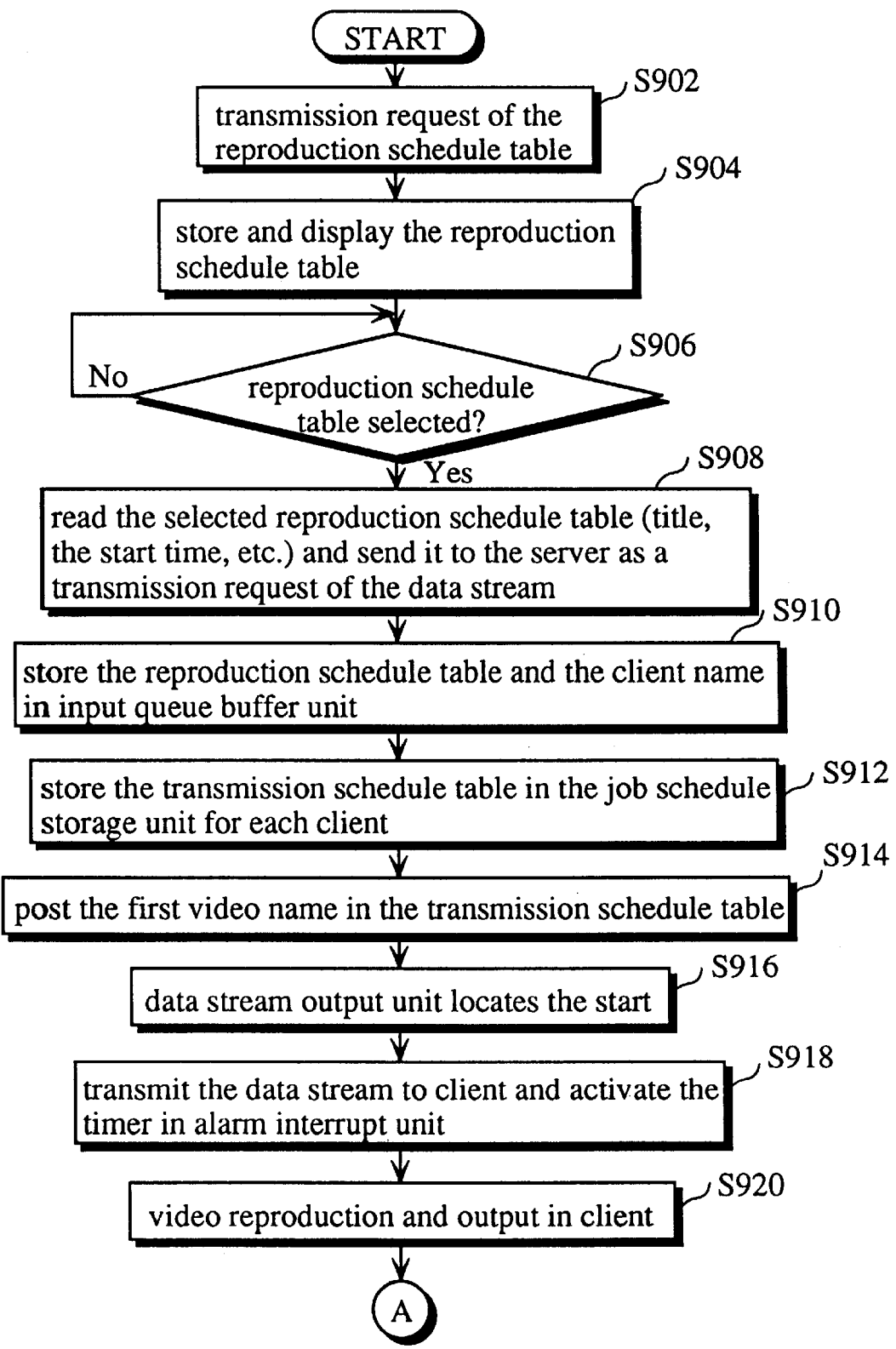
FIG. 9 shows a flowchart which explains operations of the first embodiment.
Figure 10:
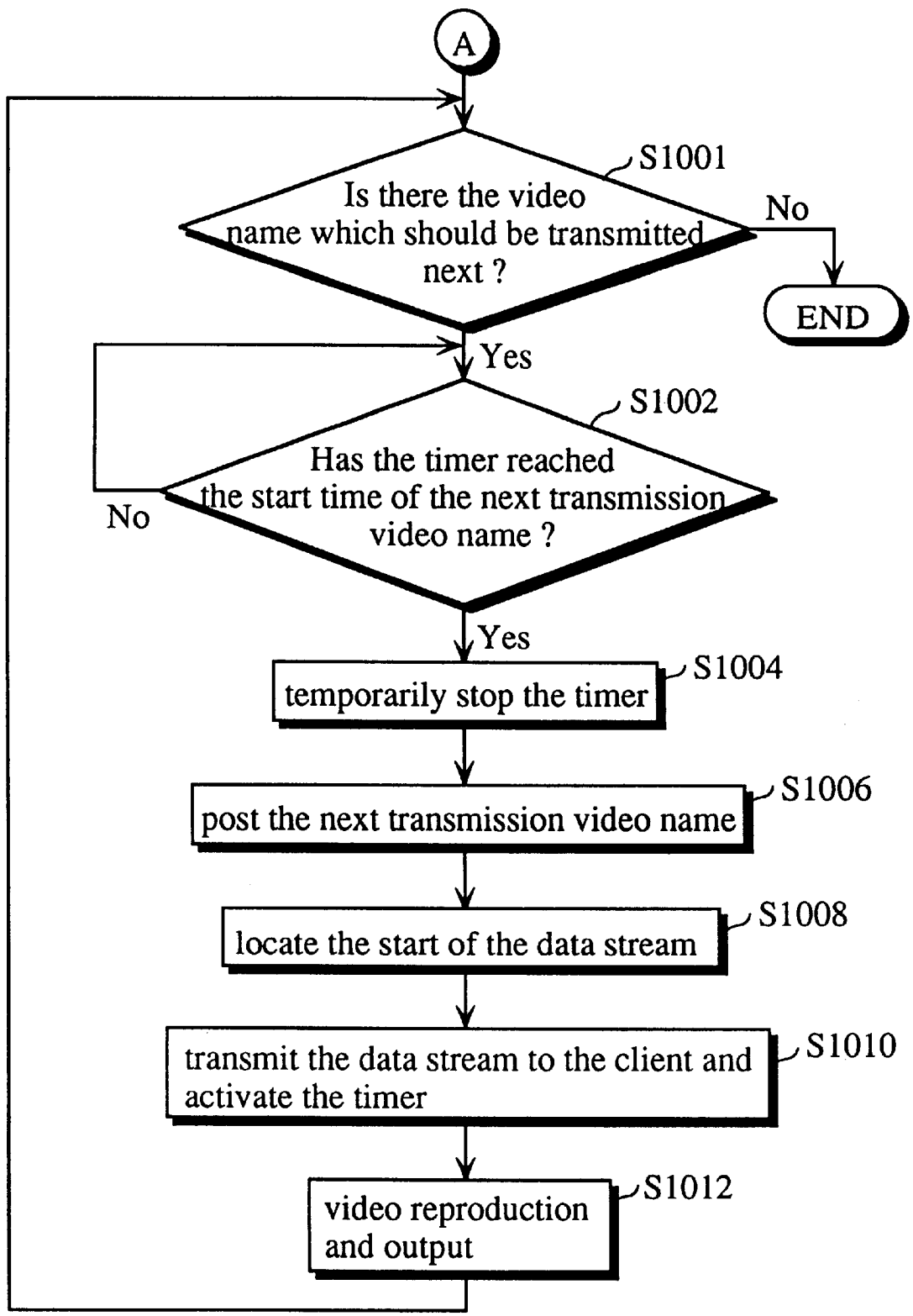
FIG. 10 shows a flowchart which explains operations of the first embodiment.

The operations of the present embodiment can be explained as follows by means of the flowcharts shown in FIGS. 9 and 10.

When the viewer operates remote controller 541 to request transmission of the reproduction schedule table so as to select the title of the video to be reproduced on TV monitor 542, client 501 transmits the transmission request of the reproduction schedule table to server 520 via network 530 (Step 902). Server 520 receives the transmission request of the reproduction schedule table from client 501 and transmits a plurality of reproduction schedule tables to client 501. Client 501 receives the reproduction schedule tables and stores them in reproduction schedule table storage unit 514 and displays them on TV monitor reception 542 (Step 904).

Client control unit 512 waits the reproduction schedule table selected by remote controller 541 via external input interface unit 511 (Step 906), roads the selected reproduction schedule table, and posts it to client I/O interface unit 513 and instructs client I/O interface unit 513 to transmit the transmission request of the data stream. Client I/O interface unit 513 transmits the client name which identifies itself and the reproduction schedule table to server I/O interface unit 521 (Stop 908).

Server I/O interface unit 521 stores the reproduction schedule table and the client name in input queue buffer unit 522 (Step 910).

Server control unit 523 reads the reproduction schedule table and the client name stored in input queue buffer unit 522, converts the reproduction schedule table to transfer schedule table. After that, server control unit 523 stores them in job schedule storage unit 524. Server control unit 523 does so for each client (Step 912). Server control unit 523 posts the first transmission video name of the transmission schedule table, its transmission start point and transmission end point, and the client name to data stream output unit 527 (Step 914).

Data stream output unit 527 locates the start of the data stream from the transmission video name and its transmission start point (Step 916), and after that, reads the data stream, gives the client name, and transmits it to I/O interface unit 521. Also, data stream transmission unit 527 notifies server control unit 523 that the data stream has been transmitted. Server I/O interface unit 521 transmits the data stream to the client identified by the client name, and server control unit 523 activates the timer of the client in alarm interrupt unit 525 (Step 918).

The client that has received the data stream reproduces and outputs the video (Step 920).

Server control unit 523 reads the transmission schedule table of the notified client from job schedule storage unit 524, and determines if there is the video name which should be transmitted next (Step 1001). If not, server control unit 523 ends processing when the on-going transmission of the data stream ends.

If there is the video name which should be transmitted next, alarm interrupt unit 525 waits until the timer of the corresponding client reaches the start time of the next transmission video in the transmission schedule table stored in job schedule storage unit 524 (Step 1002), stops the timer for a moment (Step 1004), and posts the client name to server control unit 523. Server control unit 523 posts the transmission video name, its transmission start point and transmission end point, and the client name to data stream output unit 527, and removes the mark "*" which shows that the data stream is being transmitted to that transmission video name (Stop 1006).

Data stream output unit 527 locates the start of the data stream to be transmitted (Step 1008), reads the data stream from data stream storage unit 526, posts it to server I/O interface unit 521 along with the client name, and posts the client name to server control unit 523. Server control unit 523 re-activates the time of the client in alarm interrupt unit 525, and server I/O interface unit 521 transmits the data stream to client 501 (Step 1010). Client 501 reproduces and outputs the data stream (step 1012), and goes back to Step 1002.

(Embodiment 2)

Figure 11:
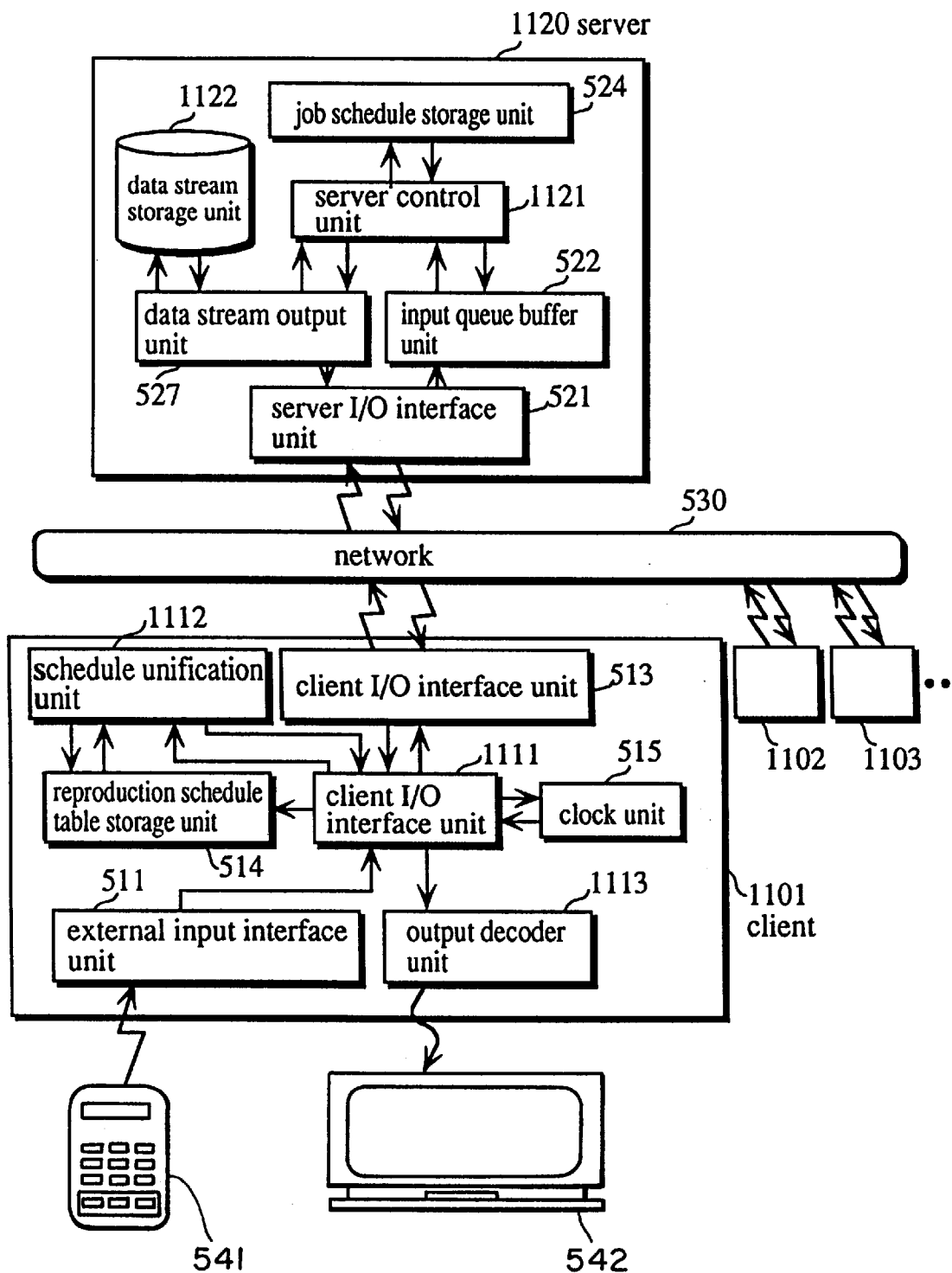
FIG. 11 shows construction of an on-demand communication system of the second embodiment of the present invention.

FIG. 11 shows construction of the on-demand communication system of the second embodiment of the present embodiment. This on-demand communication system comprises a plurality of clients 1101, 1102, 1103, . . . and server 1120, and network 530 connecting each client and server 1120.

Client 1101 comprises external input interface unit 511, client control unit 1111, client I/O interface unit 513, reproduction schedule table storage unit 514, schedule unification unit 1112, clock unit 515, output decoder unit 1113, remote controller 541 which in an input device for inputting a viewer instruction to external input interface unit 511, and TV monitor 542 which outputs the video reproduced in output decoder unit 1113.

Server 1120 comprises server I/O interface unit 521, input queue buffer unit 522, server control unit 1121, job schedule storage unit 524, data stream storage unit 1122, and data stream output unit 527.

The same construction elements as the ones in the first embodiment are given the some reference numbers and no explanations are given for them. The following explanation will focus on only the differences with the first embodiment.

Client control unit 1111 stores the reproduction schedule table posted by client I/O interface unit 513 in reproduction schedule table storage unit 514. On receiving the notification of the selected reproduction schedule table from external input interface unit 511, client control unit 1111 posts it to schedule unification unit 1112. On receiving the notification of the reproduction schedule table from schedule unification unit 1112, client control unit 1111 posts the reproduction schedule table to client I/O interface unit 513.

Other functions are the same as those of client control unit 512 of the first embodiment.

On receiving the notification of the designated reproduction schedule table from client control unit 1111, schedule unification unit 1112 reads the designated reproduction schedule table stored in reproduction schedule table storage unit 514, and inserts a title of multi-media having dummy data stream in the null time during the video reproduction in the reproduction schedule table.

Schedule unification unit 1112 calculates $K_4=K_1+(K_3-K_2)$, with $K_1$ being the reproduction start time of each video, $K_2$ being the reproduction start point of each, $K_3$ being the reproduction end point of each. Schedule unification unit 1112 determines whether $K_5$ which is the reproduction start time of the next reproduction video equals to $K_4$. If that is not the case, schedule unification unit 1112 calculates $K_6=K_5-K_4$, and after the video concerned, inserts the reproduction information whose start time is "$K_4$", reproduction vide name is "Video Null", reproduction start point is "00:00:00", reproduction end point is "$K_6$", and creates reproduction schedule table.

For example, when reproduction schedule table 601 shown in FIG. 6 is designated, in the case of reproduction video name "Video A", $K_4$=00:00:00+(00:00:30−00:00:00)=00:00:30, and it is equal to $K_5$ "00:00:30". In the case of reproduction video name "Video B", $K_4$=00:00:30+(00:01:15−00:00:30)=00:01:15, and it is not equal to $K_5$ which is "00:01:30". Therefore, $K_6-K_5-K_4$=00:01:30−00:01:15=00:00:15 is calculated, and as shown in FIG. 12, a new reproduction video name is inserted in reproduction schedule table 1201. This title is identified by reproduction video name "Video Null".

On completing creation of the new reproduction schedule table, schedule unification unit 1112 notifies the new reproduction schedule table to client control unit 1111.

In addition to the functions of the output decoder unit 516 of the first embodiment, if the data stream being posted from client control unit 1111 is "Video Null", output decoder unit 1113 does not output the video to TV monitor 542 for reproduction.

Server I/O interface unit 521 receives the client name and the reproduction schedule table transmitted from client I/O interface unit 513, and stores them in input queue buffer unit 522.

Figure 13:
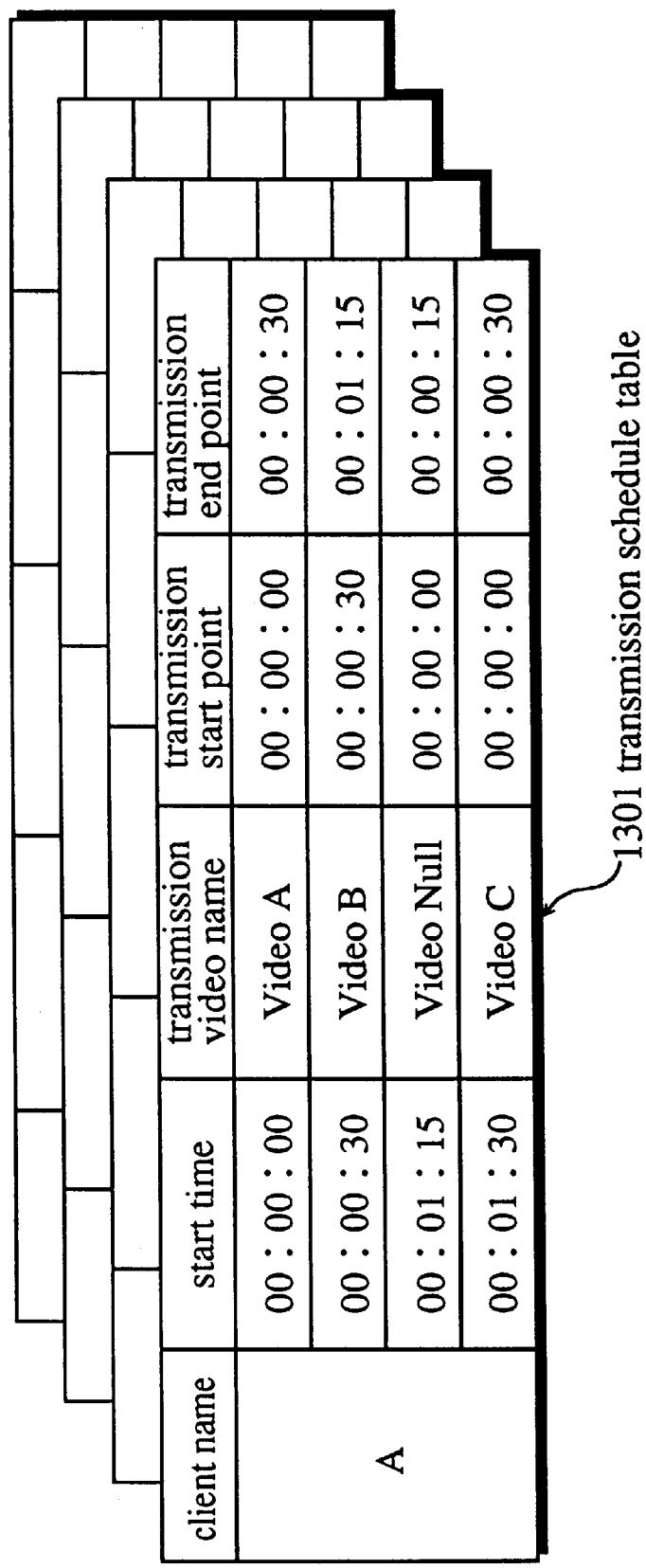
FIG. 13 shows an example of the transmission schedule stored in the job schedule storage unit of the second embodiment.

Server control unit 1121 monitors input queue buffer unit 522, and on reading the client name and the reproduction schedule table from client 1101, converts the table to transmission schedule table 1301 and stores it in job schedule storage unit 524 as shown in FIG. 13. At the same time, server control unit 1121 posts the start time "00:00:00", the transmission video name "video A", the transmission start point "00:00:00", the transmission end point "00:00:30", and the client name "A" to data stream output unit 527, and gives a transmission mark to the transmission video name, the mark showing the data stream is being transmitted, On receiving the client name from data stream output unit 527, server control unit 1121 posts the transmission video name which is next to the one with the transmission mark, with its transmission start point, transmission end point, and client name to data stream output unit 527, and removes the transmission mark to the next transmission video name.

According to the present embodiment, "Video Null" is put into the part where the transmission of the data stream is discontinued so that alarm interrupt unit 525 of the first embodiment can be omitted. Aside from that, server control unit 1121 has the same functions as alarm interrupt unit 525.

Data stream storage unit 1122 is almost the same as data stream storage unit 526 of the first embodiment, but it stores dummy data stream in the present embodiment. Its video name is "Video Null". It contains a request by which output for video reproduction is stopped at output decoder unit 516 of client 1101 while the notification of this data stream is received.

It is also possible to change this "Video Null" to the data stream comprising multi-media attribute of audio only so that only audio is reproduced in output decoder unit 516.

Data stream output unit 527 posts the client name to server control unit 1121 when the transmission of the data stream is completed in the present embodiment, unlike it notified server control unit 523 that transmission of the client name and the data stream is started when the transmission of then data stream is started in the first embodiment.

Figure 14:
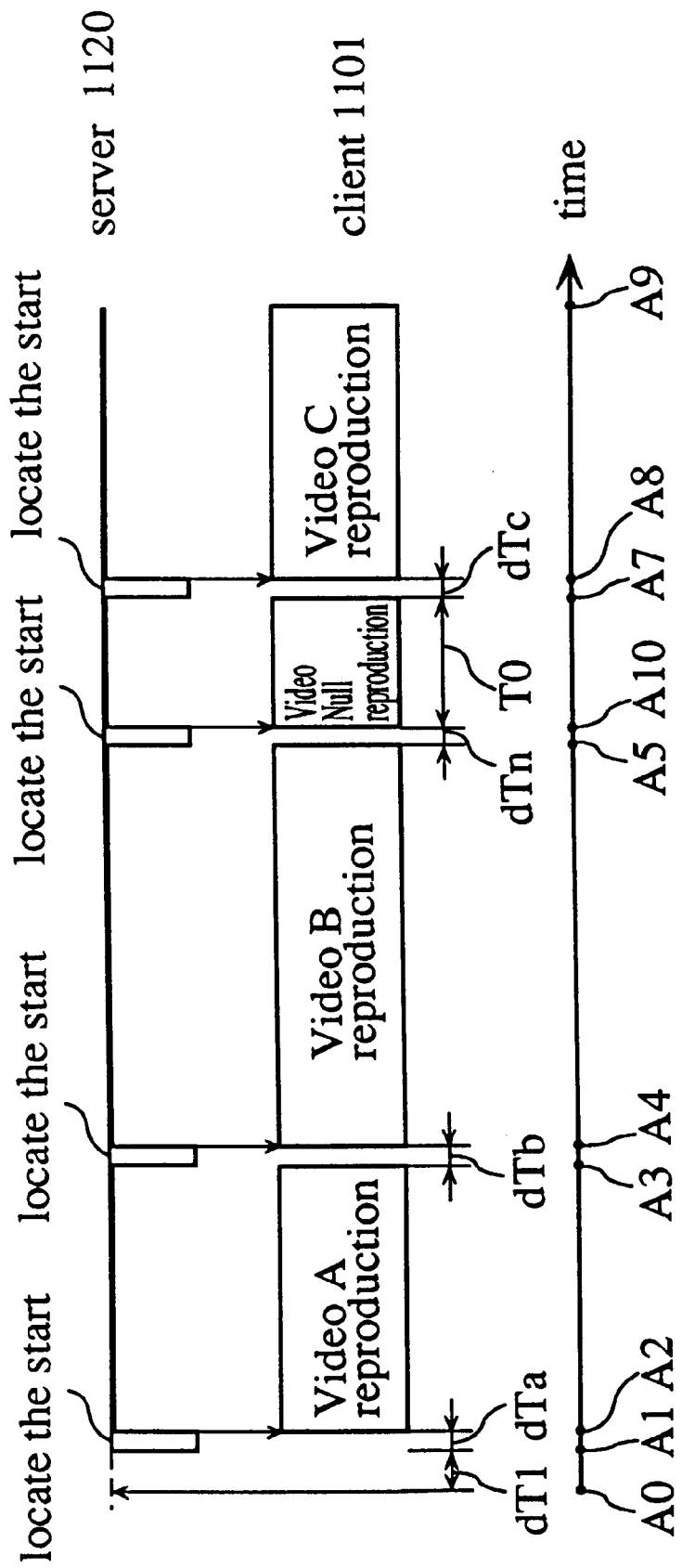
FIG. 14 shows a time chart of video reproduction of the second embodiment.

FIG. 14 shows the time chart of the video reproduction in the on-demand communication system mentioned above. What is different from the time chart of the on-demand communication system of the first embodiment (FIG. 8) is that dTn between $A_5$ and $A_{10}$ is generated for finding the start of the data stream of "Video Null". The time needed for finding the start, such as dTa, dTb, dTn, and dTc, are shorter than the time such as dT1, which is one second or so, from the moment the transmission request of the data stream is transmitted from client 1101 to server 1120 to the moment the start of the data stream is located.

The operations of the present embodiment can be explained as follows by means of the flowcharts of FIGS. 9 and 10 of the first embodiment, but it focuses on only the points different from the first embodiment.

Instead of Step 908, client control unit 1111 posts the selected reproduction schedule table to schedule unification unit 1112. Schedule unification unit 1112 reads the designated reproduction schedule table from reproduction schedule table storage unit 514, and when a disconnected part arises in video reproduction, "Video Null" is inserted into the reproduction schedule table so that "Video Null" is reproduced for only that disconnected part. When the creation of the new reproduction schedule table is completed, the reproduction schedule table is posted to client control unit 1111. On receiving the reproduction schedule table, client control unit 1111 posts the reproduction schedule table to client I/O interface unit 513, and requests transmission request of the data stream. Client I/O interface unit 513 transmits the client name which identifies itself and the posted reproduction schedule table to server I/O interface unit 521 via network 530.

Instead of Step 918, data stream output unit 527 reads the data stream, gives the client name to it, and transmits it to I/O interface unit 521. When the transmission of the data stream is completed, the client name is posted to server control unit 1121.

In the present embodiment, there are no operations that correspond to Steps 1002 and 1004.

Instead of Step 1010, data stream output unit 527 reads the data stream from data stream storage unit 526, gives the client name to it, and transmits the data stream to server I/O interface unit 521. When the transmission of the data stream is completed, data stream output unit 527 posts the client name to server control unit 1121.

Instead of Step 1012, output decoder unit 1113 of client 1101 determines whether the posted data stream is "Video Null" or not, and if it is "Video Null", stops reproduction to TV monitor 542, and if it is not "Video Null", reproduces the data stream it has received, and goes back to Step 1002.

(Embodiment 3)

Figure 15:
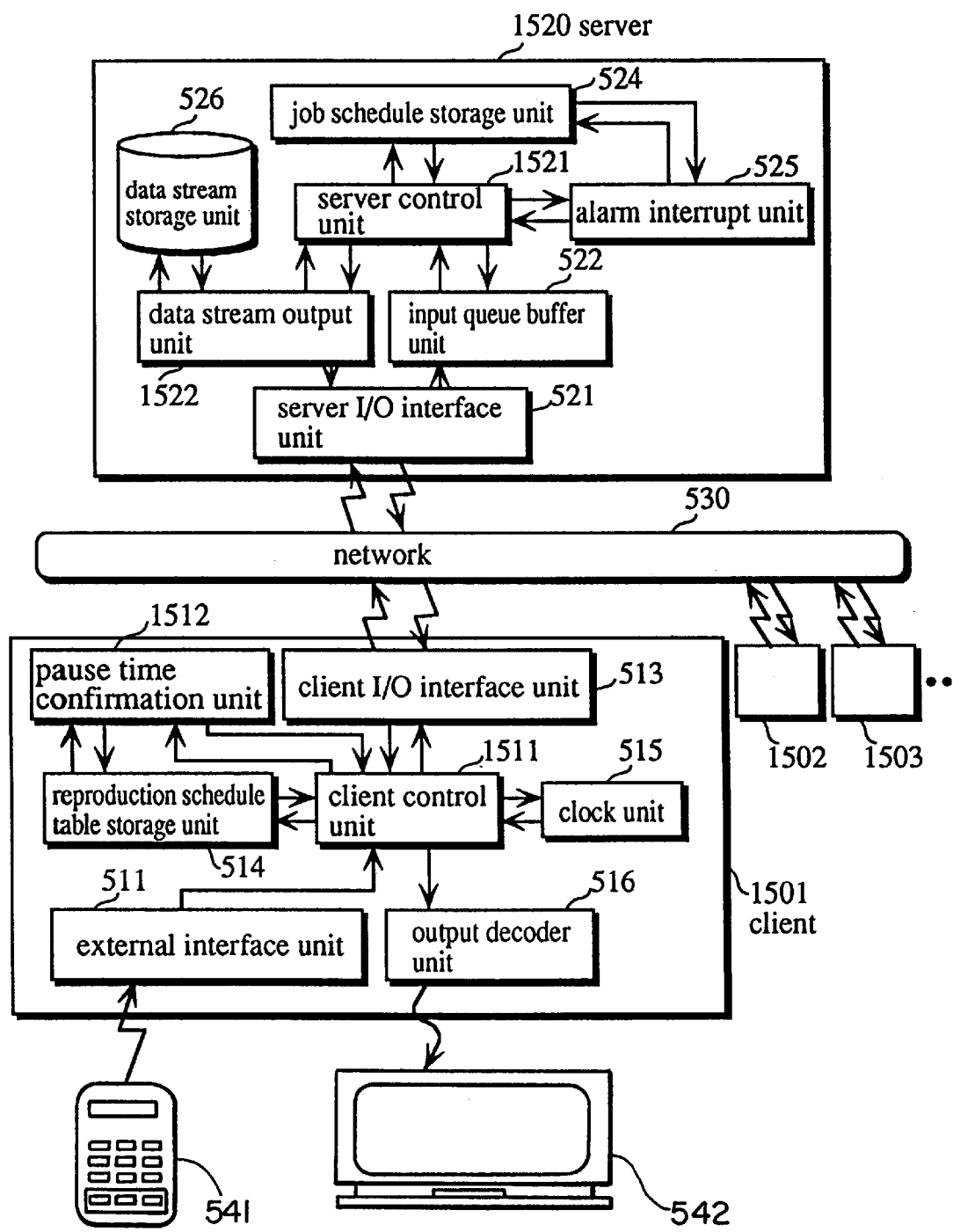
FIG. 15 shows construction of an on-demand communication system of the third embodiment of the present invention.

FIG. 15 shows the construction of the on-demand communication system of the third embodiment of the present invention.

This on-demand communication system comprises a plurality of clients 1501, 1502, 1503, . . . and server 1520, and network 530 connecting each client and server 1520.

Client 1501 comprises external input interface unit 511, client control unit 1511, client I/O interface unit 513, reproduction schedule table storage unit 514, pause time confirmation unit 1512, clock unit 515, output decoder unit 1113, remote controller 541 which is an input device for inputting a viewer instruction to external input interface unit 511, and TV monitor 542 which outputs the video reproduced in output decoder unit 516.

Server 1520 comprises server I/O interface unit 521, input queue buffer unit 522, server control unit 1521, job schedule storage unit 524, alarm interrupt unit 525, data stream storage unit 526, and pause time re-setting unit 1522, and date stream output unit 1523.

The same construction elements as the ones in the first embodiment are given the same reference numbers and figures and no explanations are given for them. The following explanation will focus on only the elements which are inherent to the present embodiment.

Client control unit 1511 has the following functions in addition to the ones of client control unit 512 of the first embodiment. On receiving the date stream from client I/O interface unit 513, client control unit 1511 posts the data stream to output decoder unit 516. Also, by referring to the clock of clock unit 515, client control unit 1511 posts the moment TS and the reproduction video name to stop time confirmation unit 1512. On receiving a stop request of the video reproduction from external input interface unit 511, client control unit 5111 instructs output decoder unit 516 to stop reproduction of the data stream to TV monitor 542 for a moment. Also, by referring to the clock of clock unit 515, client control unit 1511 posts the moment TE to stop time confirmation unit 1512. At the same time, client control unit 1511 instructs client I/O interface unit 513 to transmit the date stream transmission pause request to server 1520.

On receiving the notification of a cancel of a pause of video reproduction from external input interface unit 5111 client control unit 1511 instructs pause confirmation unit 1512 to change the reproduction schedule table. On receiving the notification of the change of the reproduction schedule table from pause confirmation unit 1512, client control unit 1511 reads the reproduction schedule table from reproduction schedule table storage unit 514, posts it to client I/O interface unit 513, and instructs client I/O interface unit 513 to transmit the pause cancel request.

On receiving the reproduction video name and TS from client control unit 1511, pause time confirmation unit 5112 stores TS, and reads reproduction start point TR which corresponds to the reproduction video name in reproduction schedule table storage unit 514. On receiving TE from client control unit 1511, pause time confirmation unit 1512 calculates reproduction-completed time TD by TD=TE−TS.

On receiving the instruction to change the reproduction schedule table from client control unit 1511, pause time confirmation unit 1512 updates the reproduction start point corresponding to the reproduction video name in the reproduction schedule table stored in reproduction schedule table storage unit 514 to "TR+TD". Moreover, pause time confirmation unit 1512 reads TB which is the start time of the video whose reproduction start point has been updated, and updates the start time of the following videos from TN(i) to TN(i)−(TB+TD), and updates the start time TB to "00:00:00". The title whose reproduction has already been completed is omitted from the schedule table. When the updating is completed, pause time confirmation unit 1512 notifies client control unit 1511 that the updating has been completed.

For example, when reproduction schedule table 601 in FIG. 6 is stored in reproduction schedule table storage unit 514, and a viewer presses a pause button of remote controller 541 in 15 seconds after the start of the reproduction of "Video A" on TV monitor 542, and later, presses a pause cancel button, reproduction schedule table 1601 shown in FIG. 16 is created by pause time confirmation unit 1512.

In addition to the functions of the first embodiment, on receiving the instruction to temporarily stop data stream transmission from client control unit 1511, client I/O interface unit 513 transmits the client name of itself and the transmission pause request to server I/O interface unit 521 via network 530.

On receiving the instructions Of the transmission of the reproduction schedule table and the pause cancel request from client control unit 1511, client I/O interface unit 513 transmits the client name of itself, the reproduction schedule table, and the pause cancel request to server I/O interface unit 521 via network 530.

In addition to the functions of server control unit 523 of the first embodiment, on reading the transmission pause request from input queue buffer 522, server control unit 1521 instructs data stream output unit 1522 to temporarily stop the output of the client name and the data stream. Also, server control unit 1521 posts the client name to alarm interrupt unit 525 and initializes the corresponding timer.

On reading the pause cancel request from input queue buffer 522, server control unit 1521 reads the reproduction schedule table, and updates the transmission schedule table of client 501 stored in job schedule storage unit 524.

In addition to the functions of the first embodiment, on receiving the transmission pause request or the pause cancel request from client 1501, server I/O interface unit 521 stores the content in input queue buffer unit 522.

Figure 17:
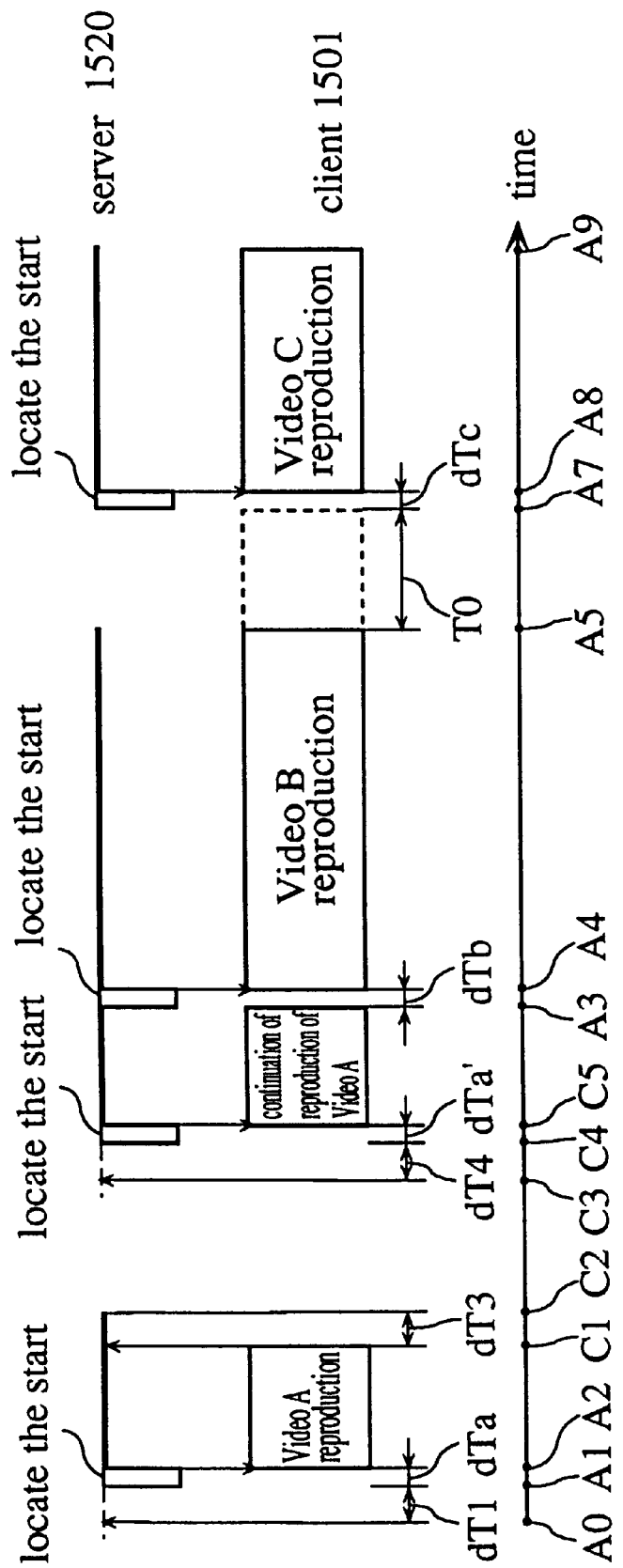
FIG. 17 shows a time chart of video reproduction of the third embodiment.

FIG. 17 shows the time chart of the video reproduction in which "pause" and "pause cancel" are carried out in the on-demand communication system mentioned above. At $C_1$, transmission temporary stop request of the data stream is transmitted from server 1520 to client 1501, At $C_2$, which is $C_1+dT_3$ ($dT_3-dT_1$), the transmission of the data stream from server 1520 is stopped for a brief moment. At $C_3$, a pause cancel request is transmitted from client 1501 to server 1520. At $C_4$, which is $C_3+dT_4$, in server 1520, the start of the continuation of "Video A" is located. At $C_5$, which is $C_4+dT_a$, the transmission of the dote stream of the continuation of "Video A" is resumed. At the same time, in client 1501, the continuation of "video A" is reproduced and outputted. There is no discontinuation between the content of "Video A" at $C_1$ and $C_5$. "Video A" will never be reproduced with some midpoints being jumped.

Figure 18:
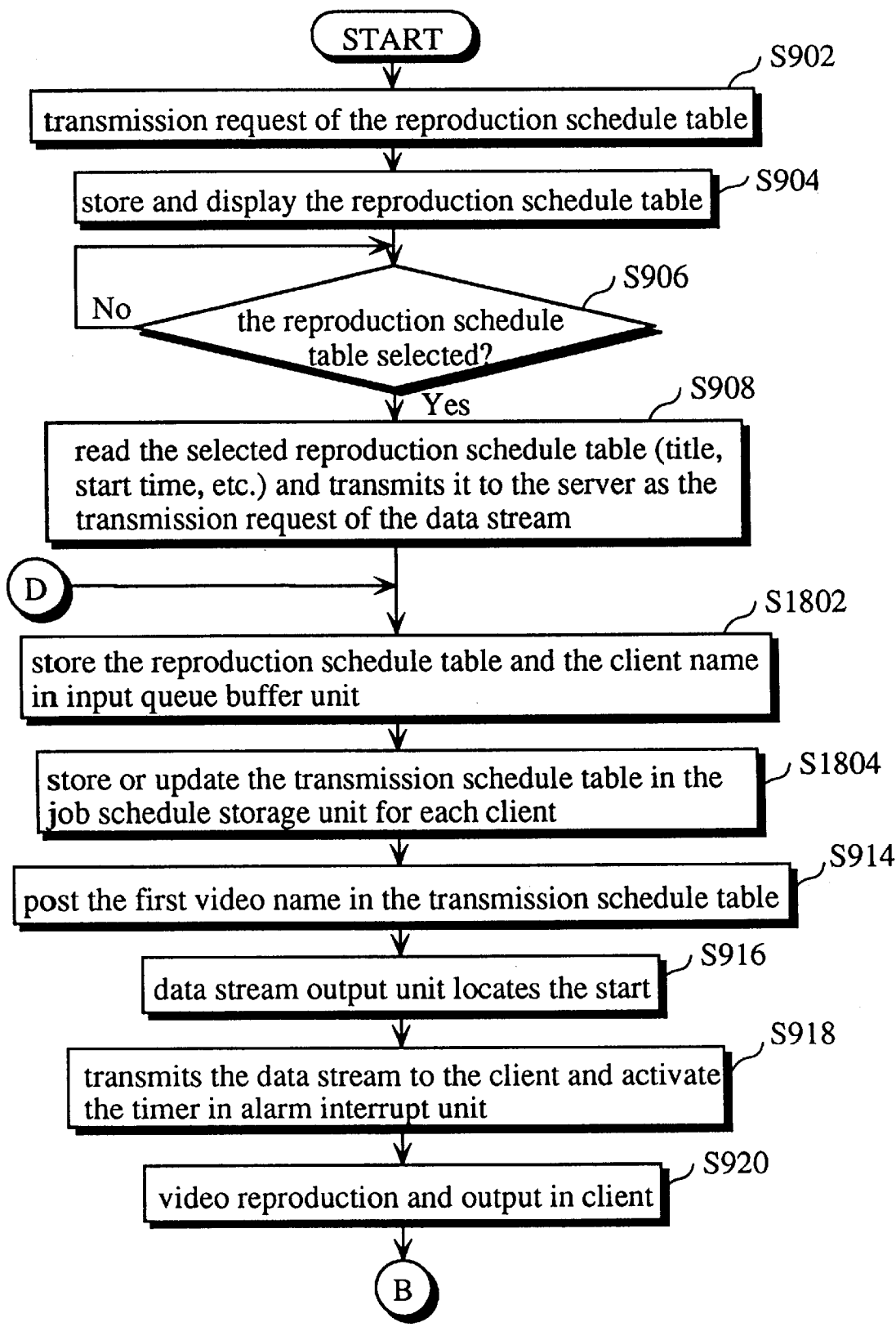
FIG. 18 shows a flowchart which explains operations of the third embodiment.
Figure 19:
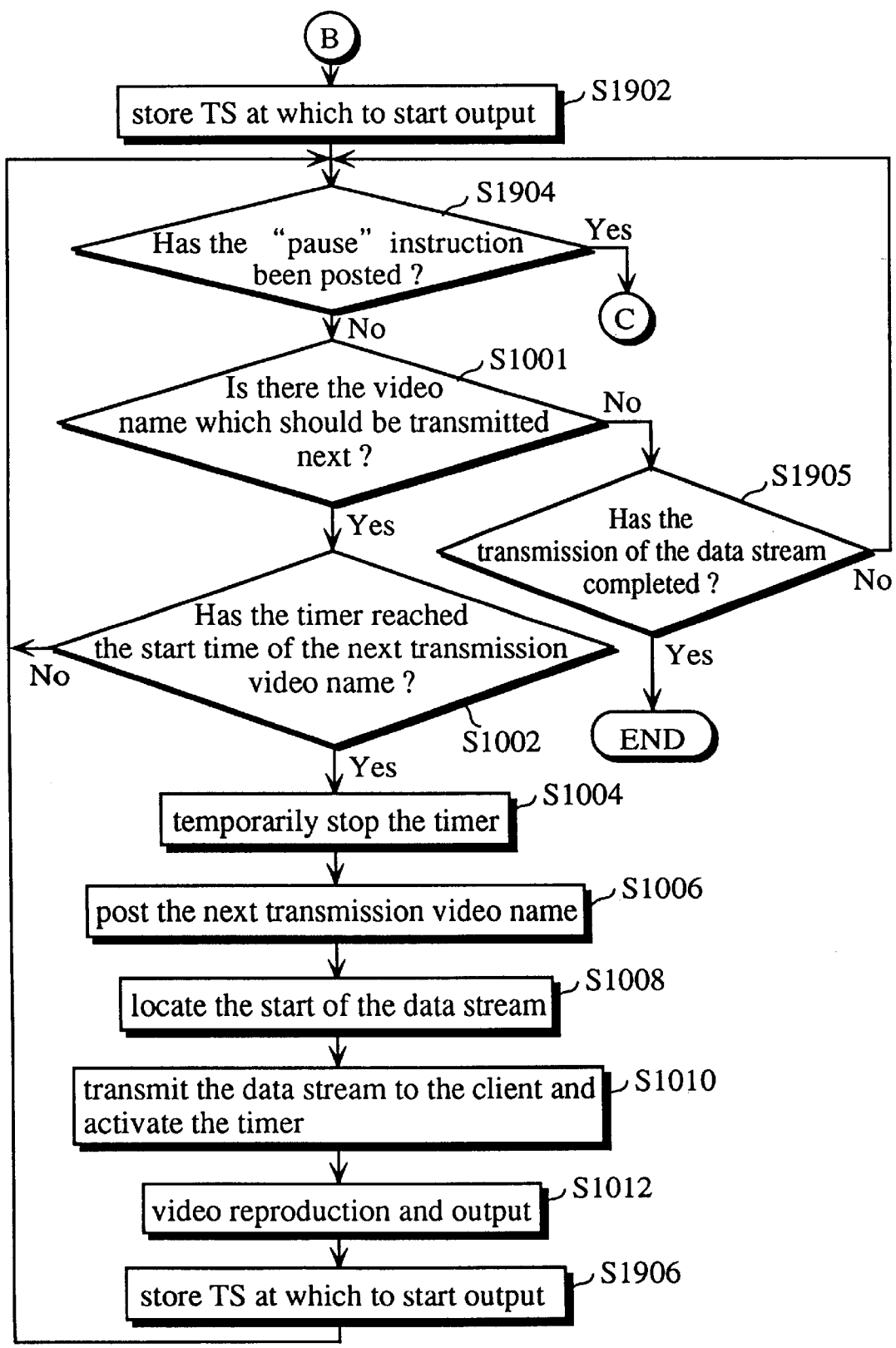
FIG. 19 shows a flowchart which explains operations of the third embodiment.
Figure 20:
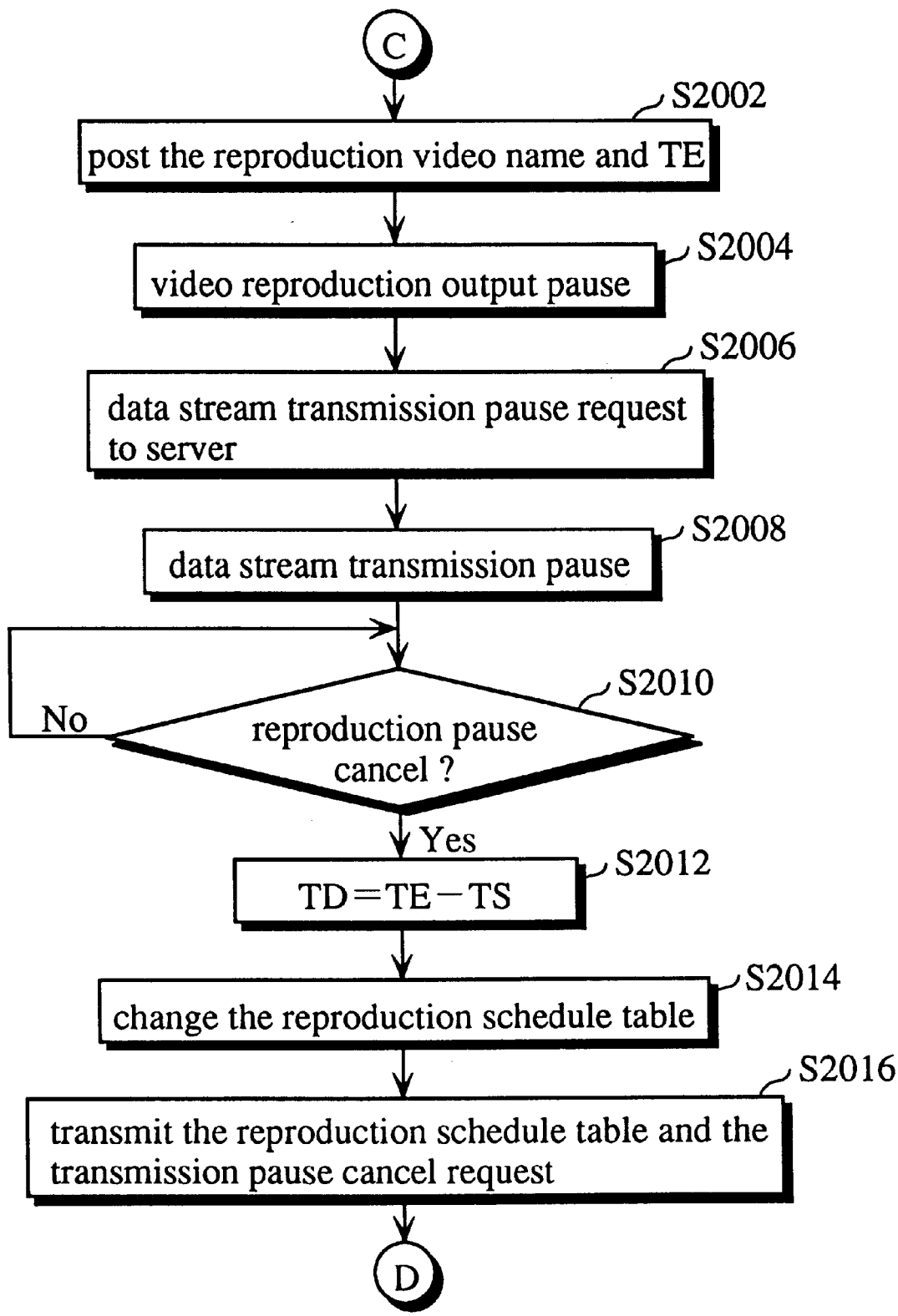
FIG. 20 shows a flowchart which explains operations of the third embodiment.

The operations of the present embodiment can be explained as follows by means of FIGS. 18, 19, and 20 The same operations as those of the first embodiment are given the same step numbers, and explanations for them are omitted. The following explanation will touch on the operations inherent to the present embodiment.

After Step 908 or step 2016, server I/O interface unit 521 stores the transmission request of the data stream it has received or the pause cancel request in input queue buffer unit 522 (Step 1802).

On reading the transmission request of the data stream from input queue buffer unit 522, server control unit 1521 converts the reproduction schedule table to transmission schedule table, and sores it for each client in job schedule storage unit 524. On reading the pause cancel request, server control unit 1521 reads the transmission schedule table in input queue buffer unit 522, and updates it to the transmission schedule table (Step 1804), and goes back to Step 914.

on being posted the start time TS at which the video is outputted to TV monitor 542 from client control unit 1511, pause time confirmation unit 1512 stores TS (Step 1902).

Next, client control unit 1511 determines whether the "pause" instruction has been posted (Step 1904). If not, client control unit 1511 goes back to Step 1001, and carries out the same processing as the first embodiment. In Step 1001, when the next transmission video name does not exist in the transmission schedule table, server control unit 1521 determines whether the on-going transmission of the data stream has been completed (Step 1905). If that is not the case, server control unit 1521 goes back to Stop 1904. If so, server control unit 1521 ends the processing. In Step 1002, if the timer does not reach the start time of the next transmission video tape, client control unit 1511 goes back to Step 1904, In Step 1012, if the next video is reproduced and outputted, pause time confirmation unit 1512 stores TS which is the moment of the start of the output (Step 1906), and goes back to Step 1904.

At Step 1904, if there is an instruction of the pause, client control unit 1511 posts the reproduction video name being outputted on TV monitor 542 and TE to pause time confirmation unit 1512 (Step 2002). On receiving the instruction from client control unit 1511, output decoder unit 516 temporarily stops the output (Step 2004). On receiving the instruction from client control unit 1511, client I/O interface unit 513 transmits the data stream transmission pause request to server 1520 (Step 2006).

On receiving the instruction of transmission pause from server control unit 1521, data stream output unit 1522 temporarily stops the output of the data stream (Step 2008).

Client control unit 1511 waits the viewer's instruction to cancel the pause of the video reproduction via external input interface unit 511 (Step 2010).

On receiving the instruction to cancel the pause, pause time confirmation unit 1512 calculates TD which is the time whose reproduction is already completed by TD=TE−TS (Step 2012), end creates a new reproduction schedule table (Step 2014).

Client I/O interface unit 513 transmits the transmission pause cancel request to server 1520 along with the reproduction schedule table posted via client control unit 1511 (Step 2016), and goes back to step 1802.

(Embodiment 4)

Figure 21:
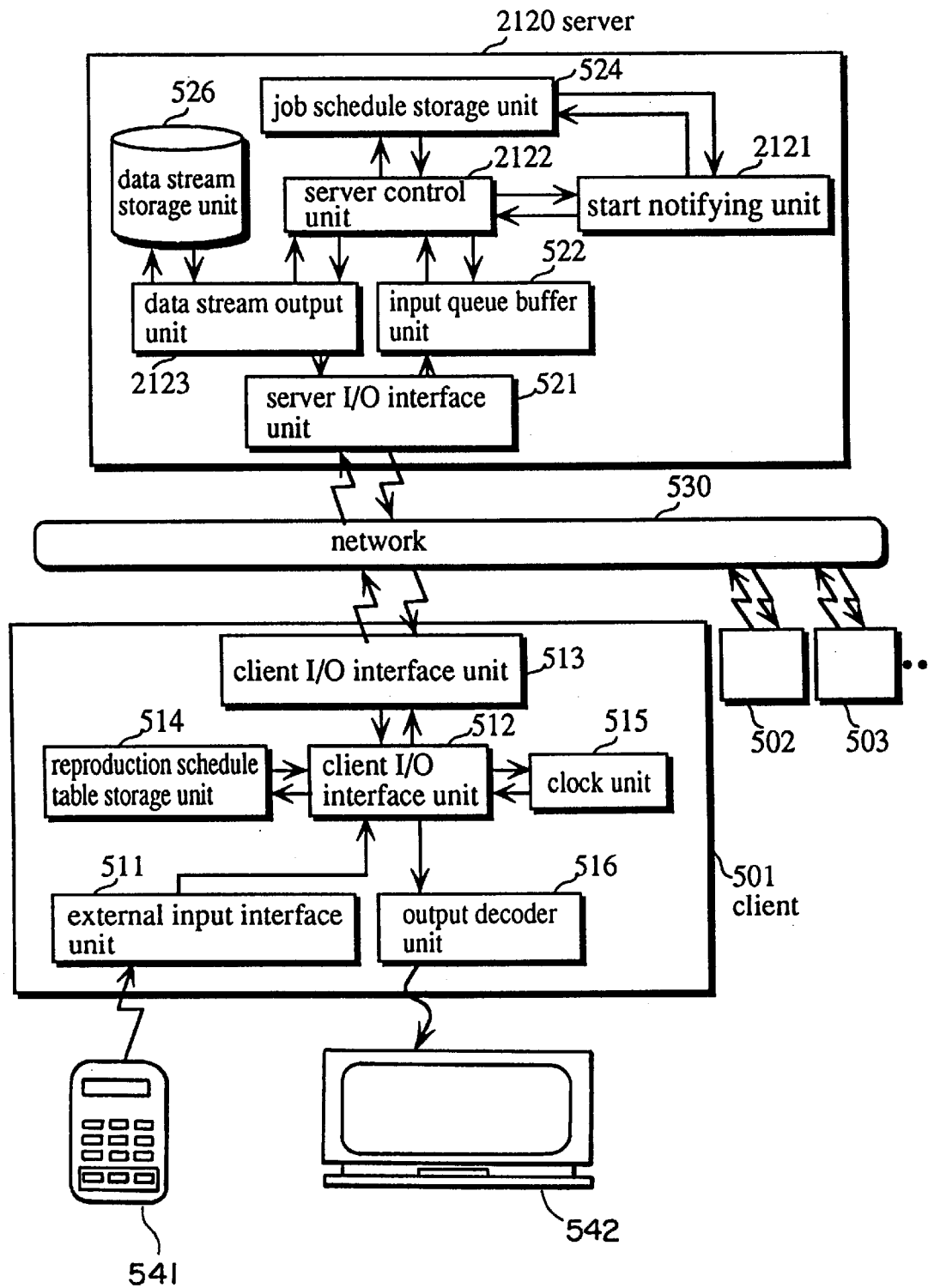
FIG. 21 shows construction of an on-demand communication system of the fourth embodiment of the present invention.

FIG. 21 shows construction of the on-demand communication system of the fourth embodiment of the present embodiment.

The difference between the present embodiment and the first embodiment is that the present embodiment comprises start notifying unit 2121 in server 2120 instead of alarm interrupt unit 525 in server 520 of the first embodiment.

The same construction elements are given the same reference numbers end no explanations are given for them.

Start notifying unit 2121 comprises a timer for each client. When a timer is activated by server control unit 2122, and reaches a certain time which is equal to (date stream transmission start time of the next title in the transmission table in job schedule storage unit 524, that corresponds to the client of the timer)–(a predetermined time t), start notifying unit 2121 posts the client name and the instruction to locate the start to server control unit 2122. When the timer reaches the start time of the data stream transmission shown by the next title in the transmission schedule table, start notifying unit 2121 posts the client name to server control unit 2122.

For the time period t, the maximum time needed for finding the start of the data stream stored in data stream storage unit 526, for example one second, is set.

In addition to the functions of server control unit 523 of the first embodiment, server control unit 2122 has the following functions. However, the relationship between the alarm interrupt unit 525 and server control unit 523 of the first embodiment is excluded, On reading the reproduction schedule table, which is the transmission request of the data stream from a client, stored in input queue buffer unit 522, server control unit 2122 converts the reproduction schedule table to the transmission schedule table for each client, stores it in job schedule storage unit 524, and sets a timer for each client that is requesting transmission of the data stream to start notifying unit 2121. On being posted the notification that the transmission of the data stream has been started along with the client name from data stream output unit 2123, server control unit 2122 initializes and activates the timer of client 501 in start notifying unit 2121. On receiving the notification of the client name and the instruction to locate the start from start notifying unit 2121, input queue buffer unit 522 reads the transmission video name which is next to the marked video name in the transmission schedule table of client 501 stored in job schedule stored unit 524 and the transmission start point, and posts them to data stream output unit 2123 along with the client name.

On receiving the notification of the client name from start notifying unit 2121, server control unit 2122 reads the transmission video name which is next to the marked one in the transmission schedule table of client 501 stored in job schedule storage unit 524, and removes the mark to the next transmission video name. At the same time, server control unit 2122 posts the transmission video name, its transmission end point, and the client name to data stream output unit 2123.

On receiving the instruction of the transmission of the reproduction schedule table from server control unit 2122, data stream output unit 2123 reads the reproduction schedule table stored in data stream storage unit 526, and posts it to server I/O interface unit 521 along with the client name.

On receiving the notification of the transmission video name, its transmission start point, and the client name from server control unit 2122, data stream output unit 2123 locates the start of the data stream whose title is identified by the transmission video name of data stream storage unit 526 beforehand. On receiving the transmission video name, its transmission end point, and the client name from server control unit 2122, data stream output unit 2123 transmits the data stream whose start is being located to input interface unit 521 along with the client name.

Figure 22:
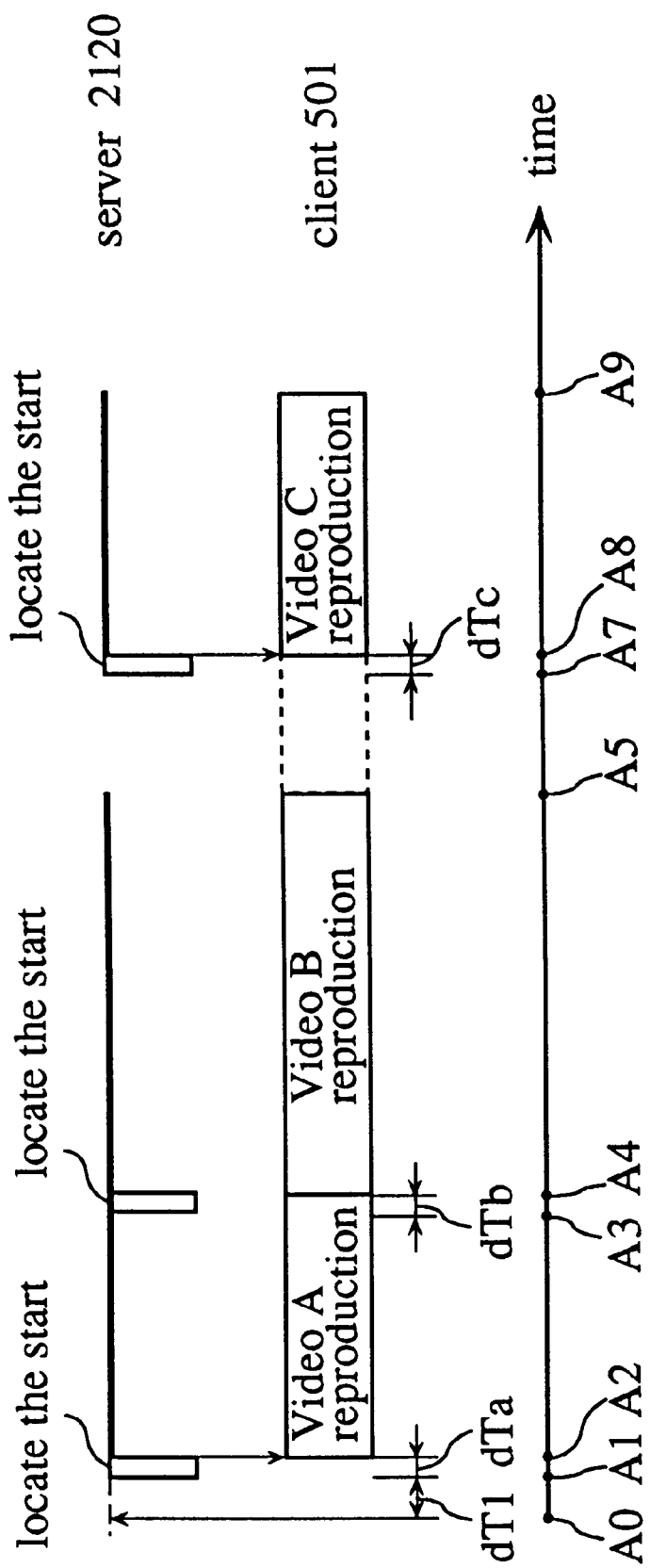
FIG. 22 shows a time chart of video reproduction of the fourth embodiment.

FIG. 22 shows the time chart of the video reproduction in the on-demand communication system mentioned above. At $A_0$, client 501 transmits the transmission request of the data stream to server 2120. At server 2120, it takes $dT_1$ for processing. At $A_1$, the start of "Video A" is located. At $A_2$, transmission of the data stream is started. Also at $A_2$, client 501 starts output of the reproduction of "Video A".

Output unit 2123 of the data stream of server 2120 starts locating the start of "Video B" at $A_3$, which is one second prior to the start time of the data stream transmission of "Video B". And at $A_4$, output unit 2123 starts output of the data stream of "Video B".

In client 501, reproduction output of "Video B" is started almost at the same time as $A_4$.

In server 2120, the start of "Video C" is located at $A_7$ set prior to $A_8$ which is the transmission start time of "Video C". The time difference between $A_7$ and $A_5$ are predetermined. At $A_8$, data stream ot "Video C" is transmitted to client 501. Client 501 reproduces and outputs "Video C" at $A_8$.

Figure 23:
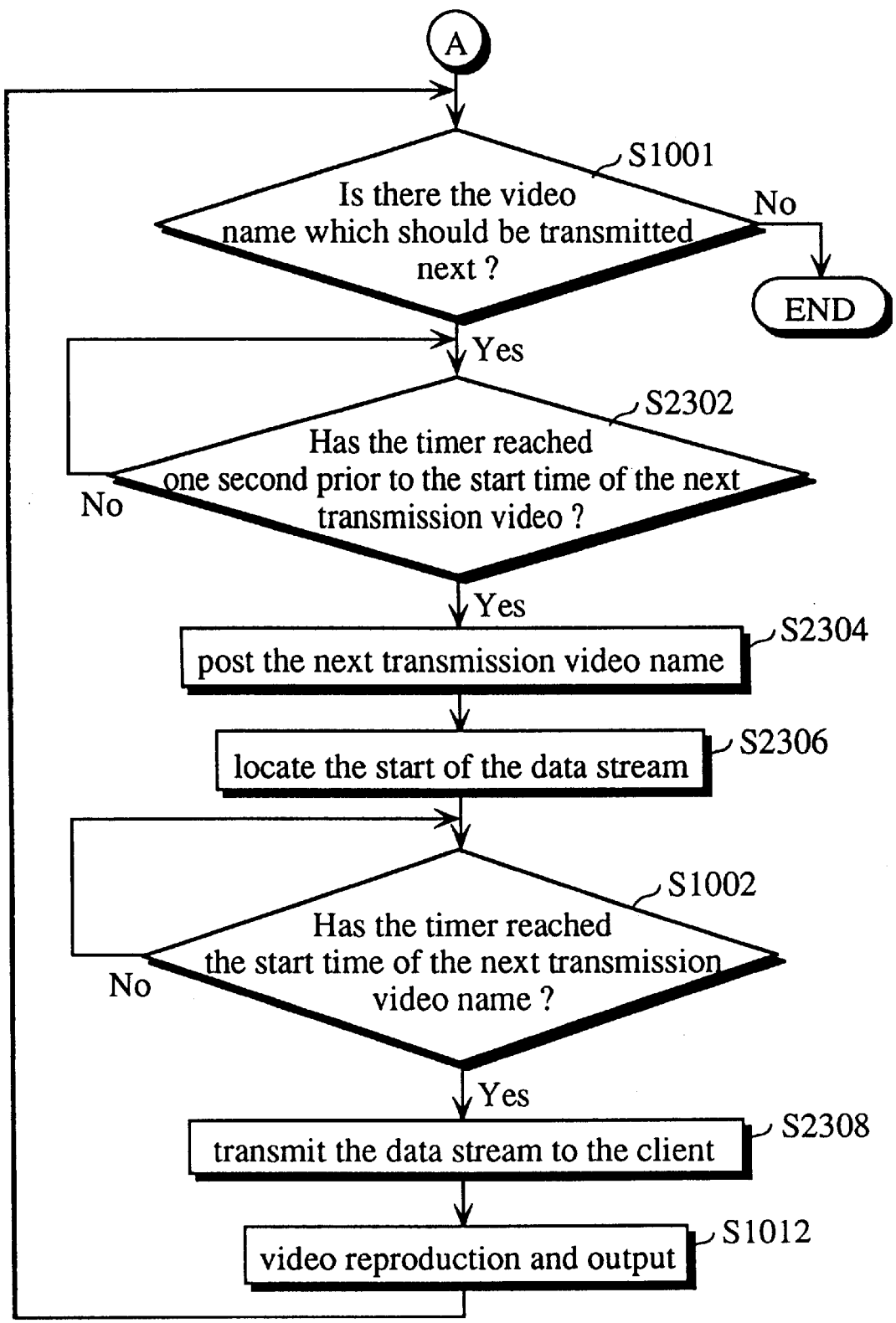
FIG. 23 shows a flowchart which explains operations of the fourth embodiment.

The operations of the present embodiment can be explained as follows by means of the flow chart of FIGS. 9 and 23. The same operations as the first embodiment are given the same step numbers, and explanations for them are omitted.

In addition to Step 918, data stream is transmitted from server 2120 to client 501, and a timer corresponding to client 501 in start notifying unit 2121 is activated.

In Step 1001, when there is the next transmission video name, start notifying unit 2121 waits until the timer reaches one second prior to the start time of the next transmission video (Step 2302), and when the time comes, posts the client name to server control unit 2122. Server control unit 2122 posts the next transmission video name to data stream transmission unit 2123 (Step 2304). Data stream output unit 2123 locates the beginning of the data stream to be transmitted next beforehand (Step 2306). Start notifying unit 2121 waits until the timer reaches the start time of the next transmission video (Step 1002), and when the time comes, posts the client name to server control unit 2122. Server control unit 2122 posts the next transmission video name and the list to data stream output unit 2123. Data stream output unit transmits the data stream to client 501 via server I/O interface unit 521 and network 530 (Step 2308).

In the embodiments mentioned above, transmission between servers and clients are carried out by optical fiber circuits of network 530. Also, satellite digital broadcasting can be used as an another embodiment.

Although the present invention has been fully described by way of examples with reference to the accompanying drawings, it is to be noted that various changes and modifications will be apparent to those skilled in the art. Therefore, unless such changes and modifications depart form the scope of the present invention, they should be construed as being included therein.

What is claimed is:

1. An on-demand communication system in which a plurality of clients and a multi-media server are connected via a network and a data stream is transmitted in response to a transmission request of a title from one of the clients, each client comprising:

transmission means which transmits a set of reproduction information comprising a plurality of titles and reproduction start time of each of their the data streams to the server along with a client identifier for identification;

reception means for receiving the data stream transmitted from the server; and reproduction and output means for reproducing and outputting the data stream received by the reception means, the server comprising:

reception buffer for temporarily storing the set of the reproduction information and the client identifier transmitted from the transmission means;

transmission information creation means for reading the set of the reproduction information and the client identifier stored in the reception buffer and creating a set of transmission information for each client, wherein the transmission information includes a title and a transmission start time that are equal to the title and the reproduction start time in the reproduction information;

transmission information storage means for storing the set of the transmission information for each client which was created by the transmission information creation means;

data stream storage means for storing groups of data stream per title;

transmission instruction means for reading the set of the transmission information stored in the transmission information storage means and giving a transmission instruction when the transmission start time comes; and data stream transmission means for reading the data stream which corresponds to the title in the transmission information and is stored in the data stream storage means and transmitting it to the client, wherein the transmission instruction includes the title and the client identifier.

2. The on-demand communication system of claim 1, wherein the server further includes:

start-locating instruction means which reads the set of transmission information stored in the transmission information storage means and instructs locating a start of the data stream at a given time earlier than the transmission start time; and data stream start-locating means for locating the start of the data stream on receiving the instruction from the start-locating means.

3. The on-demand communication system of claim 2, wherein the transmission information created by the transmission information creation means comprises transmission point information including a transmission start point and a transmission end point of the data stream of the title, and the reproduction information transmitted from the client includes reproduction point information including a reproduction start point and a reproduction end point of the data stream of the title, wherein the start-locating instruction means of the server includes;

first timer unit which activates a timer assigned to the client and measures time when the data stream transmission means starts transmitting the data stream;

launch of start-locating determination unit for determining whether the time measured by the timer unit has reached the given time earlier than the transmission start time; and first instruction unit which instructs the data stream start-locating means to locate the start of the data stream, posting the transmission start point of the data stream of the title.

4. The on-demand communication system of claim 3, wherein the transmission instruction means of the server includes:

second timer unit which activates a timer assigned to the client and measures time when the data stream transmission means starts transmitting the data stream;

transmission start determination unit for determining whether the time measured by the timer unit has reached the transmission start time; and second instruction unit which instructs the data stream transmission means to transmit the data stream, posting the transmission end point of the data stream of the title.

5. The on-demand communication system of claim 4, wherein the reproduction point information and the transmission point information are shown by the time needed when the data stream of the title is reproduced under a normal condition.

6. The on-demand communication system of claim 5, wherein each client further includes:

reproduction information obtaining means for obtaining a list of the sets of reproduction information which can be received from the server; and reproduction information set selection means which receives one of the sets of the reproduction information selected by a viewer.

7. The on-demand communication system of claim 1, wherein the transmission information created by the transmission information creation means comprises transmission point information including a transmission start point and a transmission end point of the data stream of the title, wherein the reproduction information transmitted from the client includes reproduction point information including a reproduction start point and a reproduction end point of the data stream of the title, wherein the transmission instruction means of the server includes;

timer unit which activates a timer assigned to the client and measures time when the data stream transmission means starts transmitting the data stream;

transmission start determination unit for determining whether the time measured by the timer unit has reached the transmission start time; and instruction unit which instructs the data stream transmission means to transmit the date stream, posting the transmission point information, when the transmission start determination unit determines that the time measured by the timer unit has reached the transmission start time, wherein the data stream transmission means includes:

start-locating unit for locating the start of the data stream on being given the transmission instruction including the transmission start point of the data stream of the title from the instruction unit;

timer interruption unit which stops the timer in the timer unit while the start-locating unit is locating the start of the data stream; and transmission unit for transmitting the data stream up to the transmission end point after the start of the data stream is located by the start-locating unit.

8. The on-demand communication system of claim 7, wherein the reproduction point information and the transmission point information are shown by the time needed when the data stream of the title is reproduced under a normal condition.

9. The on-demand communication system of claim 8, wherein each client further includes:

reproduction information obtaining means for obtaining a list of the sets of reproduction information which can be received from the server; and reproduction information set selection means which receives one of the sets of the reproduction information selected by a viewer.

10. The on-demand communication system of claim 1, wherein the client further includes:

reproduction information adding means which adds new reproduction information between continuing two units of reproduction information when the null time can be recognized by the reproduction start time and the reproduction point information between two data streams belonging to the continuing two units of reproduction information, respectively, the new reproduction information including a dummy title and reproduction start time of the date stream of the dummy title, wherein the reproduction information transmitted by the transmission means comprises the reproduction point information shown by the time needed when the reproduction start point and the reproduction end point of the data stream of the title are reproduced under a normal condition;

reproduction and output prohibiting means for prohibiting the reproduction and output of the reproduction output means while the reception means is receiving the dummy date stream, which includes a reproduction and output prohibiting request;

wherein the server further includes:

dummy data stream storage means for storing the dummy data stream of the dummy title; and dummy data stream transmission means which reads the dummy data stream stored in the dummy data stream storage means and transmits it to the client when the dummy title is included in the transmission instruction.

11. The on-demand communication system of claim 10, wherein the reproduction information adding means includes:

reproduction and time calculating unit which calculates $K_4=K_1+(K_3-K_2)$, with $K_1$ being the reproduction start time, $K_2$ being the reproduction start point, $K_3$ being the reproduction end point, and $K_4$ being the reproduction end time of the data stream of the title;

null time determination unit which determines that null time exists when $K_6=0$ after calculating $K_6=K_5-K_4$, with $K_5$ being the reproduction start time of the data stream of the next title;

reproduction information inserting unit which inserts the reproduction information of the dummy title whose data stream reproduction start time is $K_4$, data stream reproduction start point is "0", and data stream reproduction end point is $K_6$ when the null time determination unit determines that the null time exists.

12. The on-demand communication system of claim 11, wherein the reproduction point information and the transmission point information are shown by the time needed when the data stream of the title is reproduced under a normal condition.

13. The on-demand communication system of claim 12, wherein each client further includes:

reproduction information obtaining means for obtaining a list of the sets of reproduction information which can be received from the server; and reproduction information sot selection means which receives one of the sets of the reproduction information selected by a viewer.

14. The on-demand communication system of claim 1, wherein each client further includes:

reproduction pause operation means which temporarily stops the reproduction and output of the reproduction output means;

reproduction time measuring means which measures the reproduction time of the data stream of the title until the reproduction and output of the reproduction output means is temporarily stopped;

pause request transmission means which transmits a pause request of the transmission of the data stream to the server when the reproduction and output is temporarily stopped;

pause cancel operation means which receives a cancel request of the pause;

reproduction information change means which changes the set of the reproduction information based on the reproduction time measured by the reproduction time measuring means when the cancel request is received, wherein the reproduction information comprises the reproduction point information including the reproduction start point and the reproduction end point of the data stream of the title;

cancel request transmission means for transmitting the client identifier and the set of the reproduction information changed by the reproduction information change means to the server along with the cancel request, wherein the server further includes:

pause request and cancel request receiving buffer which temporarily stores the pause request transmitted from the pause request transmission means and the cancel request including the set of the reproduction information and the client identifier transmitted from the cancel request transmission means;

transmission pause instruction means which reads the pause request stored in the pause request and cancel request receiving buffer and instructs the data stream transmission means to temporarily stop the transmission of the data stream to the client, thereby the data stream transmission means temporarily stops the transmission of the data stream to the client;

transmission information change means which reads the set of the reproduction information and the client identifier stored in the pause request and cancel request receiving buffer, creates new transmission information, and changes the transmission information of the client already stored in the transmission information storage means to the new transmission information; and pause cancel instruction means which activates the transmission instruction means when the transmission information change means changes the transmission information.

15. The on-demand communication system of claim 14, wherein the reproduction information change means includes:

reproduction start time calculating unit which calculates TN=TN−(TB+TD), with TB being the reproduction start time of the data of the title whose reproduction and output is temporarily stopped, TN being the start time of the data stream of the title to be reproduced after the said title, TD being the reproduction time measured by the reproduction time measuring means;

reproduction information updating unit which updates the start time of the date stream of the title to be reproduced after the title whose reproduction and output is temporarily stopped to TN calculated by the reproduction start time calculation unit, the start time of the data stream of the title whose reproduction and output is temporarily stopped to "0", and "TR" to "TR+TD", with TR being the reproduction start point of the title whose reproduction and output is temporarily stopped;

reproduction information deletion unit for deleting the reproduction information of the title reproduced before the title whose reproduction and output is temporarily stopped from the set of the reproduction information.

16. The on-demand communication system of claim 15, wherein the reproduction point information and the transmission point information are shown by the time needed when the data stream of the title is reproduced under a normal condition.

17. The on-demand communication system of claim 16, wherein each client further includes:

reproduction information obtaining means for obtaining a list of the sets of reproduction information which can be received from the server; and reproduction information sot selection means which receives one of the sets of the reproduction information selected by a viewer.

* * * * *